United States Patent
Labrèche et al.

(10) Patent No.: US 10,341,012 B2
(45) Date of Patent: Jul. 2, 2019

(54) ADAPTIVE SATELLITE CHANNELIZER

(71) Applicant: MACDONALD, DETTWILER AND ASSOCIATES CORPORATION, Saint-Anne-de-Bellevue Québec (CA)

(72) Inventors: Oliver Labrèche, Saint-Laurent (CA); Michel Thériault, Boisbriand (CA); Pierre Talbot, Pierrefonds (CA)

(73) Assignee: Space Systems/Loral, LLC, Palo Alto, CA (US)

( * ) Notice: Subject to any disclaimer, the term of this patent is extended or adjusted under 35 U.S.C. 154(b) by 79 days.

(21) Appl. No.: 15/725,194

(22) Filed: Oct. 4, 2017

(65) Prior Publication Data

US 2019/0103912 A1    Apr. 4, 2019

(51) Int. Cl.
*H04B 7/185* (2006.01)
*H04B 7/195* (2006.01)
*H04B 7/204* (2006.01)

(52) U.S. Cl.
CPC ..... *H04B 7/18515* (2013.01); *H04B 7/18521* (2013.01); *H04B 7/195* (2013.01); *H04B 7/2041* (2013.01)

(58) Field of Classification Search
CPC .. H04B 7/18515; H04B 7/2041; H04B 7/195; H04B 7/18521
See application file for complete search history.

(56) References Cited

U.S. PATENT DOCUMENTS

| | | | |
|---|---|---|---|
| 2002/0047637 A1* | 4/2002 | Victor | H01J 31/06 315/294 |
| 2017/0070308 A1* | 3/2017 | Hahn, III | H03F 1/02 |
| 2017/0214500 A1* | 7/2017 | Hreha | H04L 5/0023 |
| 2018/0041275 A1* | 2/2018 | Gallagher | H04B 10/118 |
| 2018/0287694 A1* | 10/2018 | Buehler | H04B 7/18513 |

* cited by examiner

*Primary Examiner* — Hashim S Bhatti
(74) *Attorney, Agent, or Firm* — Vierra Magen Marcus LLP

(57) ABSTRACT

An example of a configurable channelizer includes N input ports and K output ports, each supporting M separately sampled subchannels; and one or more control circuits configured to store and apply a set of first routing tables to route subchannels in groups of R subchannels, each first routing table has M*K/R entries that link M*K/R groups of subchannels with the input ports, where R is an integer that is greater than or equal to 1.

18 Claims, 18 Drawing Sheets

Field of Regard

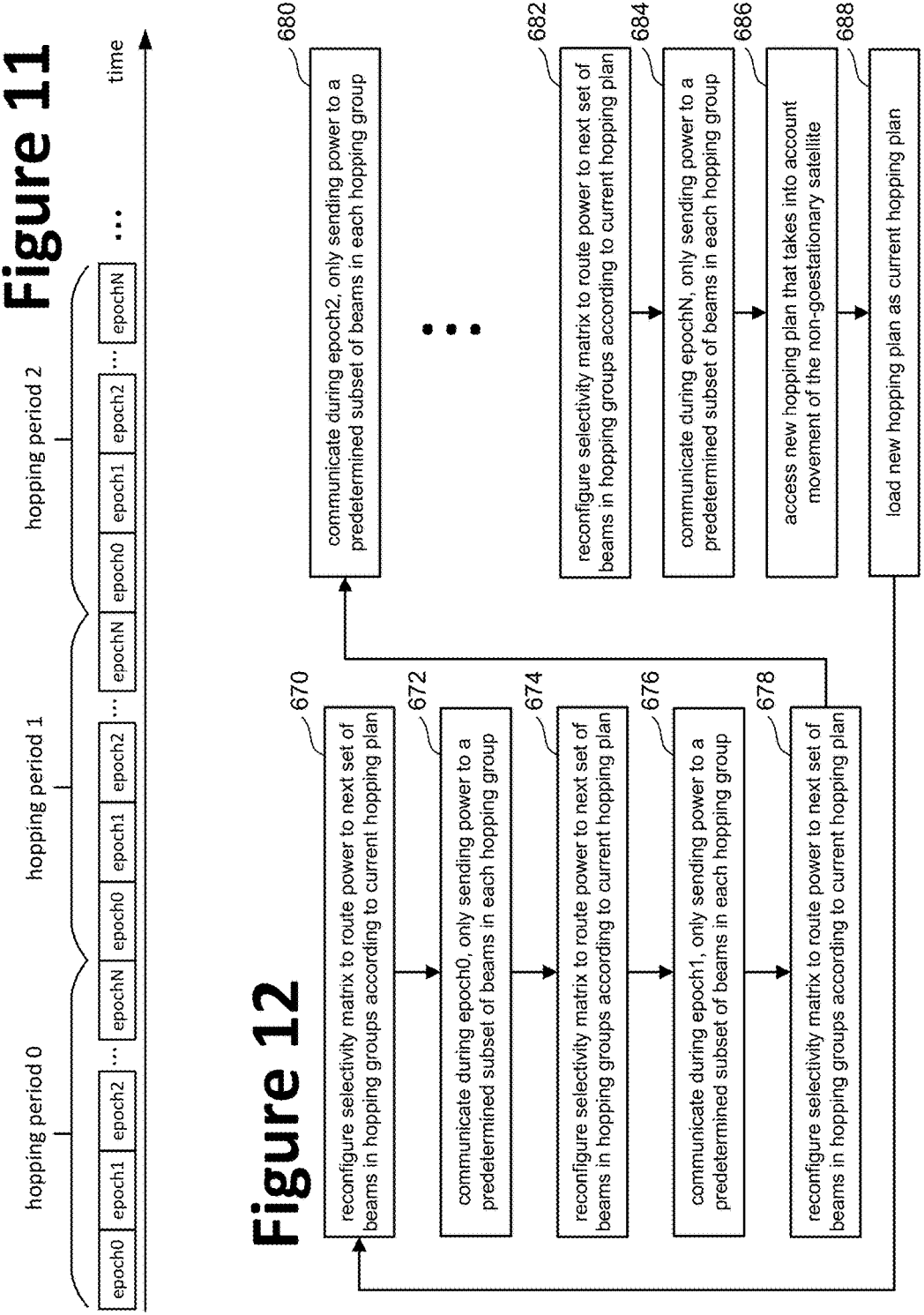

| Table 1500 | | | |
|---|---|---|---|
| Tx SC ID | Tx SB ID | Rx SB ID | Rx SC ID |
| 1 to 100 | 1 | 4 | 301 to 400 |
| 101 to 200 | 2 | 3 | 201 to 300 |
| 201 to 300 | 3 | 5 | 401 to 500 |
| 301 to 400 | 4 | 2 | 101 to 200 |
| 401 to 500 | 5 | 1 | 1 to 100 |

| Table 1600 | | | |
|---|---|---|---|
| Tx SC ID | Tx SB ID | Rx SB ID | Rx SC ID |
| 1 to 25 | 1 | 13 | 301 to 325 |
| 26 to 50 | 2 | 11 | 251 to 275 |
| 51 to 75 | 3 | 18 | 426 to 450 |
| ⋮ | ⋮ | ⋮ | ⋮ |
| 476 to 500 | 20 | 5 | 101 to 125 |

ADAPTIVE SATELLITE CHANNELIZER

BACKGROUND

The present disclosure relates to technology for satellite communication systems.

Satellite communication systems typically include one or more satellites and a set of ground terminals. Such systems typically operate within regulations that allocate operating frequency bandwidth for a particular communications service and specify, among other things, a maximum signal power spectral density of communications signals radiated to the ground. A growing market exists for provision of high data rate communication services to individual consumers and small businesses which may be underserved by or unable to afford conventional terrestrial services. Satellite communication systems have been proposed to provide such high data rate communication services. However, designing a satellite system to meet these needs is challenging.

BRIEF DESCRIPTION OF THE DRAWINGS

FIG. 11 is a timing diagram illustrating time domain beam hopping.

FIG. 12 is a flow chart describing one embodiment of a process for performing time domain beam hopping.

DETAILED DESCRIPTION

System Overview

Figure 1:
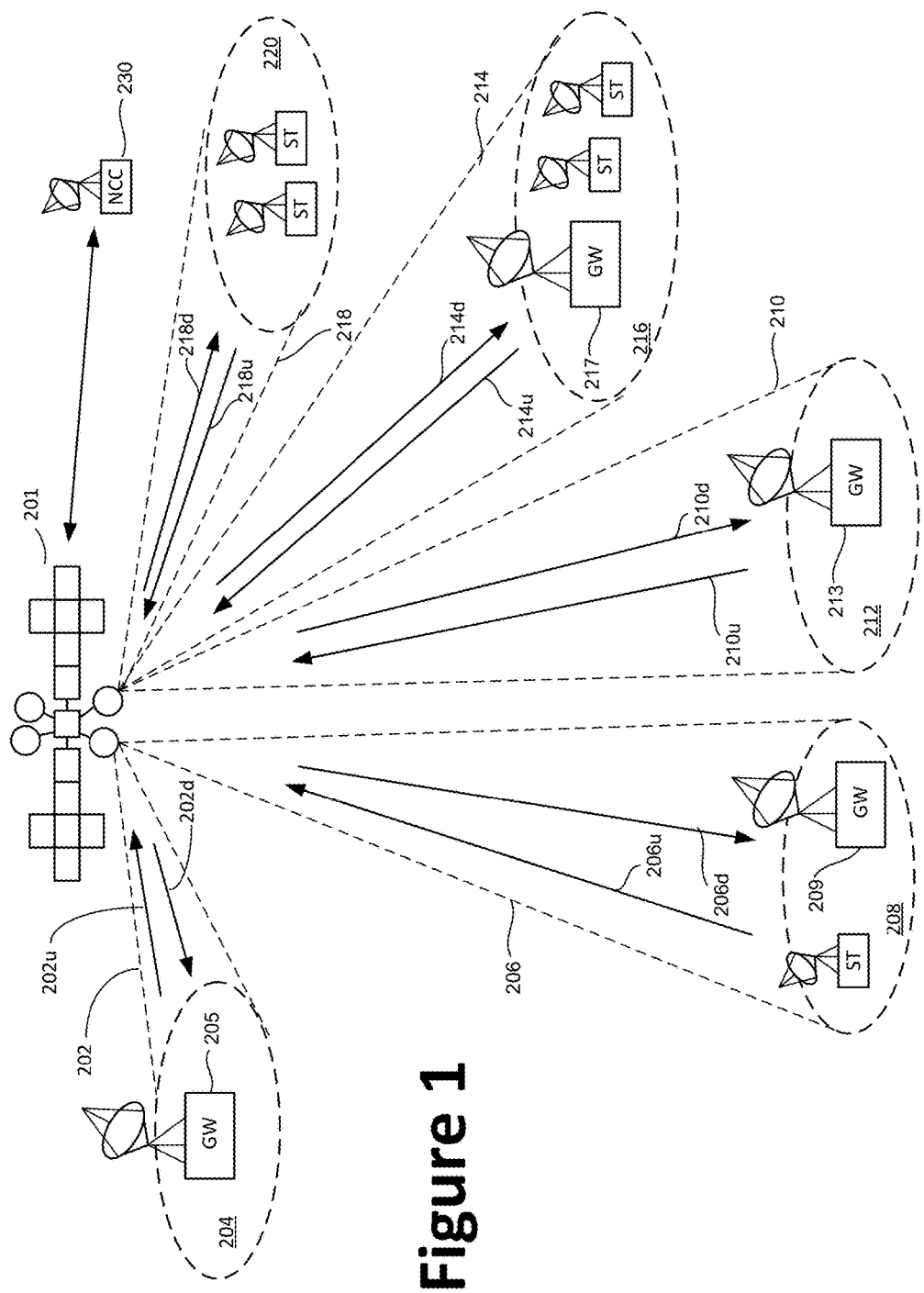
FIG. 1 is a block diagram describing one embodiment of a portion of a satellite communications system.

A satellite communication system may include a constellation of non-geostationary satellites orbiting the Earth, a plurality of gateways and a plurality of subscriber terminals (also referred to as terminals). The subscriber terminals communicate with the gateways via the satellites, as the satellites move in orbit. Each of the satellites provide a plurality of non-articulated spot beams that implement time domain beam hopping and a plurality of steerable spot beams for communicating with the gateways and subscriber terminals. The system can be used to provide access to the Internet or other network, telephone services, video conferencing services, private communications, broadcast services, as well as other communication services.

One example of a satellite communication system comprises one or more non-geostationary satellites. Each satellite is configured to provide a plurality of spot beams using time domain beam hopping among the spot beams. The spot beams are divided into hopping groups and each satellite is configured to switch throughput and power among spot beams in a same hopping group at intervals of an epoch over a hopping period according to a hopping plan.

A configurable channelizer in a satellite routes data traffic to implement a beam hopping plan. A channelizer routes data traffic from input ports to output ports according to routing tables. Data may be received at an input port of a channelizer and may be separated into subchannels that are separately sampled. An input may undergo a transformation equivalent to filtering and sampling (in any order) to provide several hundred subchannels, with each subchannel representing a portion of the spectrum of the input. For example, an input port may divide a received input into 100 subchannels, with each subchannel corresponding to a different 1 MHz frequency range (for a total of 100 MHz). In some cases, input ports may share circuits for dividing and sampling input (e.g. two or more input ports may use a common receiver circuit to divide and sample input). Each subchannel may be separately routed according to routing tables.

A configurable channelizer allows efficient routing of larger spectral ranges than the subchannel range (e.g. larger than 1 MHz where each subchannel is 1 MHz). A configurable channelizer groups subchannels together and routes grouped subchannels (or sub-bands) using a simplified routing table that contains entries for groups of subchannels, and does not require individual entries for each subchannel. This may result in significantly smaller tables which can be more efficiently stored and may be rapidly accessed. A configurable channelizer may be configurable to route data of different bandwidth and thus may be easily configured for different applications. For example, in satellite applications, some communications may be relatively narrow-band communications (e.g. 1 MHz or less) so that each such communication may correspond to a subchannel and may be individually routed (individual subchannel routing). Other communications may be relatively wide-band communications (e.g. 50 MHz, 100 MHz, or more) so that such communications may correspond to multiple subchannels that are grouped together and routed together as a group using a simple routing table with an entry for a group of subchannels instead of individual entries for subchannels. A configurable channelizer, and a satellite containing a configurable channelizer, may be configurable to accommodate communications ranging from narrow-band to broad-band so that less customization is required and one-time engineering costs may be reduced for a given application.

FIG. 1 is a block diagram depicting a portion of a satellite communications system that includes one or more satellites. FIG. 1 depicts satellite 201, which may be a geostationary satellite or a non-geostationary satellite. A geostationary satellite moves in a geosynchronous orbit (having a period of rotation synchronous with that of the Earth's rotation) in the plane of the Equator, so that it remains stationary in relation to a fixed point on the Earth's surface. This orbit is often achieved at an altitude of 22,300 miles (35,900 km)

above the earth; however, other altitudes can also be used. A non-geostationary satellite is a satellite that is not a geostationary satellite and is not in an orbit that causes the satellite to remain stationary in relation to a fixed point on the Earth's surface. Examples of non-geostationary satellites include (but are not limited to) satellites in Low Earth Orbits ("LEO"), Medium Earth Orbits ("MEO") or Highly Elliptical Orbits ("HEO"). Although FIG. 1 only shows one satellite, in some embodiments (as described below) the system will include multiple satellites that are referred to as a constellation of satellites.

In one embodiment, satellite 201 comprises a bus (i.e., spacecraft) and one or more payloads, including a communications payload. The satellite may also include multiple power sources, such as batteries, solar panels, and one or more propulsion systems, for operating the bus and the payload. The satellite includes an antenna system that provides a plurality of beams, including non-articulated and steerable spot beams, for communicating with subscriber terminals and gateways.

A subscriber terminal is a device that wirelessly communicates with a satellite, usually to be used by one or more end users. The term subscriber terminal may be used to refer to a single subscriber terminal or multiple subscriber terminals. A subscriber terminal is adapted for communication with the satellite communication system including satellite 201. Subscriber terminals may include fixed and mobile subscriber terminals including, but not limited to, a cellular telephone, wireless handset, a wireless modem, a data transceiver, a paging or position determination receiver, or mobile radiotelephone, a cellular backhaul, a trunk, an enterprise computing or storage device, an airborne device, a maritime device or a head end of an isolated local network. A subscriber terminal may be hand-held, portable (including vehicle-mounted installations for cars, trucks, boats, trains, planes, etc.) or fixed as desired. A subscriber terminal may be referred to as a wireless communication device, a mobile station, a mobile wireless unit, a user, a subscriber, a terminal or a mobile.

The term gateway may be used to refer to a device that communicates wirelessly with a satellite and provides an interface to a network, such as the Internet, a wide area network, a telephone network or other type of network. In some embodiments, gateways manage the subscriber terminals.

FIG. 1 also shows a Network Control Center 230, which includes an antenna and modem for communicating with satellite 201, as well as one or more processors and data storage units. Network Control Center 230 provides commands to control and operate satellite communication payload 201, as well as all other satellite communication payloads in the constellation. Network Control Center 230 may also provide commands to any of the gateways (via a satellite or a terrestrial network) and/or subscriber terminals.

In one embodiment, satellite 201 is configured to provide two hundred fixed (i.e., non-articulated so that they are fixed in relation to satellite 201) spot beams that use time domain beam hopping among the spot beams. In other embodiments, more or less than two hundred spot beams can be used for the time domain beam hopping. In one embodiment, the two hundred hopping beams are divided into thirty-six hopping groups such that one beam in each group is active at a given time; therefore, thirty-six of the two hundred spot beams are active at an instance in time. In addition to the two hundred non-articulated spot beams that perform time domain beam hopping, one embodiment of satellite 201 includes eight 4.2 degree steerable spot beams used to communicate with gateways. In other embodiments, more or less than eight can be used. Additionally, satellite 201 includes six 2.8 degree steerable spot beams which can have a dual purpose of communicating with gateways and/or providing high capacity communication for subscriber terminals that would otherwise fall under the hopping beams of the two hundred spot beams performing time domain beam hopping. Other embodiments can use different sized spot beams.

For example, purposes only, FIG. 1 shows five spot beams: 202, 206, 210, 214 and 218. Spot beam 202 is a 4.2 degree steerable spot beam that illuminates coverage area 204 for communicating with one or more gateways 205 via downlink 202d and uplink 202u. Spot beam 206 is a 2.8 degree steerable dual-purpose beam that illuminates coverage area 208 in order to communicate with one or more gateways 209 and one or more subscriber Terminals ST via downlink 206d and uplink 206u. Spot beam 210 is a 2.8 degree steerable spot beam that could be used to communicate with gateways and/or subscriber terminals ST, but in the example of FIG. 1 spot beam 210 illuminates coverage area 212 to communicate with one or more gateways 213 via downlink 210d and uplink 210u. The two hundred spot beams that perform time domain beam hopping can be used to communicate with subscriber terminals and/or gateways. Spot beams 214 and 218 are two examples of the two hundred non-articulated spot beams that performed time domain beam hopping. Spot beam 214 illuminates coverage area 216 to communicate with one or more gateways 217 and one or more subscriber terminals ST via downlink 214d and uplink 214u. Spot beam 218 illuminates coverage area 220 to communicate with subscriber terminals ST via downlink 218d and uplink 218u.

Figure 2:
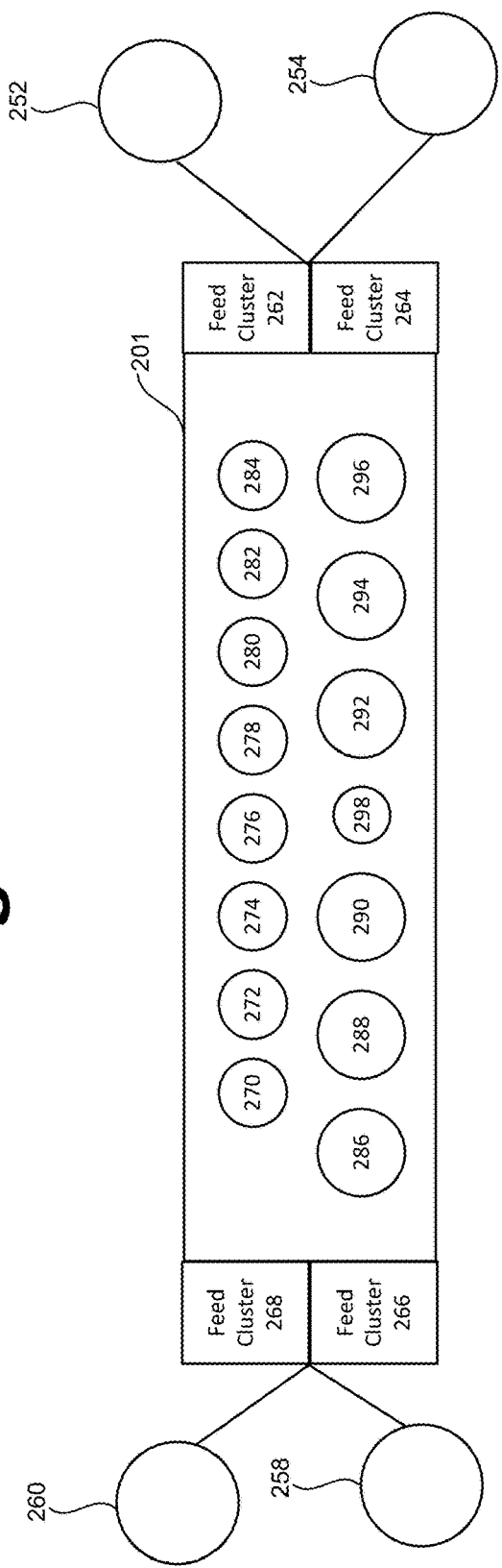
FIG. 2 is a block diagram depicting a satellite and its antenna system.

FIG. 2 is a block diagram depicting more details of one embodiment of an antenna system of satellite 201. For example, FIG. 2 shows antennas 252, 254, 258 and 260 which provide the two hundred spot beams that implement time domain beam hopping. Each of antennas 252, 254, 258 and 260 provide fifty spot beams each. FIG. 2 shows feed cluster 262 pointed at antenna 252, feed cluster 264 pointed at antenna 254, feed cluster 266 pointed at antenna 258 and feed cluster 268 pointed at antenna 260. Additionally, satellite 201 includes six 2.8 degree steerable antennas for communicating with gateways and/or providing high capacity beams for subscriber terminals, including antennas 286, 288, 290, 292, 294 and 296. Satellite 201 also includes eight 4.2 degree steerable antennas for communicating with gateways, including antennas 270, 272, 274, 276, 278, 280, 282 and 284. In one embodiment, the antennas are mechanically steerable. In another embodiment, a phased array or other means can be used to electronically steer the spot beams. Satellite 201 also includes an antenna 298 for communicating with network control center 230 in order to provide telemetry and commands to satellite 201, and provide status and other data back to network control center 230.

Antenna 298, or any of the other antennas, can also be used to provide a beacon signal. In some embodiments, satellite 201 can include an additional antenna for providing the beacon signal. In traditional satellites, the beacon signal provides subscriber terminals and gateways with a gauge to determine how much power should be used. A terminal on the ground can transmit a signal which the satellite will use to generate a corresponding downlink, which can then be compared to the strength of the beacon signal, and then can adjust its power up or down to match the beacon signal. The beacon signal can also be used to determine when a satellite is not operational. Additionally, beacon signals can be used to compensate for Doppler shift. Since the terminals knows the beacon is supposed to be on a certain frequency, it can calculate its Doppler based on the current reception of the beacon signal.

Figure 3:
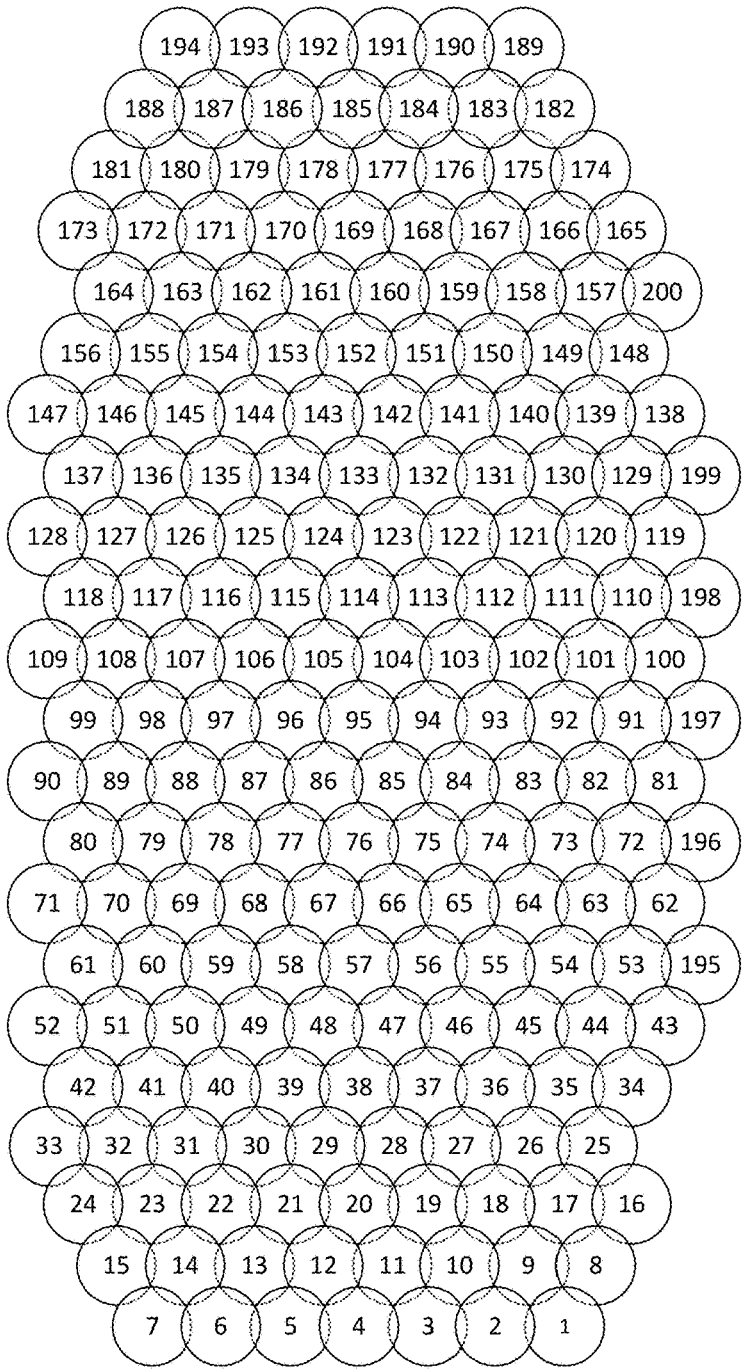
FIG. 3 depicts a beam map for a Field of Regard.

FIG. 3 provides an example beam map for the two hundred non-articulated spot beams of satellite 201 that implement time domain beam hopping. In one embodiment, those spot beams are fixed in direction, relative to satellite 201. As can be seen, the two hundred spot beams depicted in FIG. 3 are numbered 1-200. In one embodiment, the spot beams overlap; for example, the −5 dB contour of each spot beam overlaps with the −5 dB contour of other spot beams neighboring it. All the spot beams together comprise the Field of Regard of satellite 201. The Field of Regard of the satellite is different than the Field of View of the satellite. For example, the Field of Regard is the target area that the satellite can see/communicate based on its position. Thus, the entire beam map of FIG. 3 is the Field of Regard. In contrast, the Field of View is the area that the satellite's payload can actually see at an instance in time. For example, when performing time domain beam hopping, only a subset of those spot beams depicted in FIG. 3 are active at a given time. Therefore, the Field of View is less than the Field of Regard.

Figure 4:
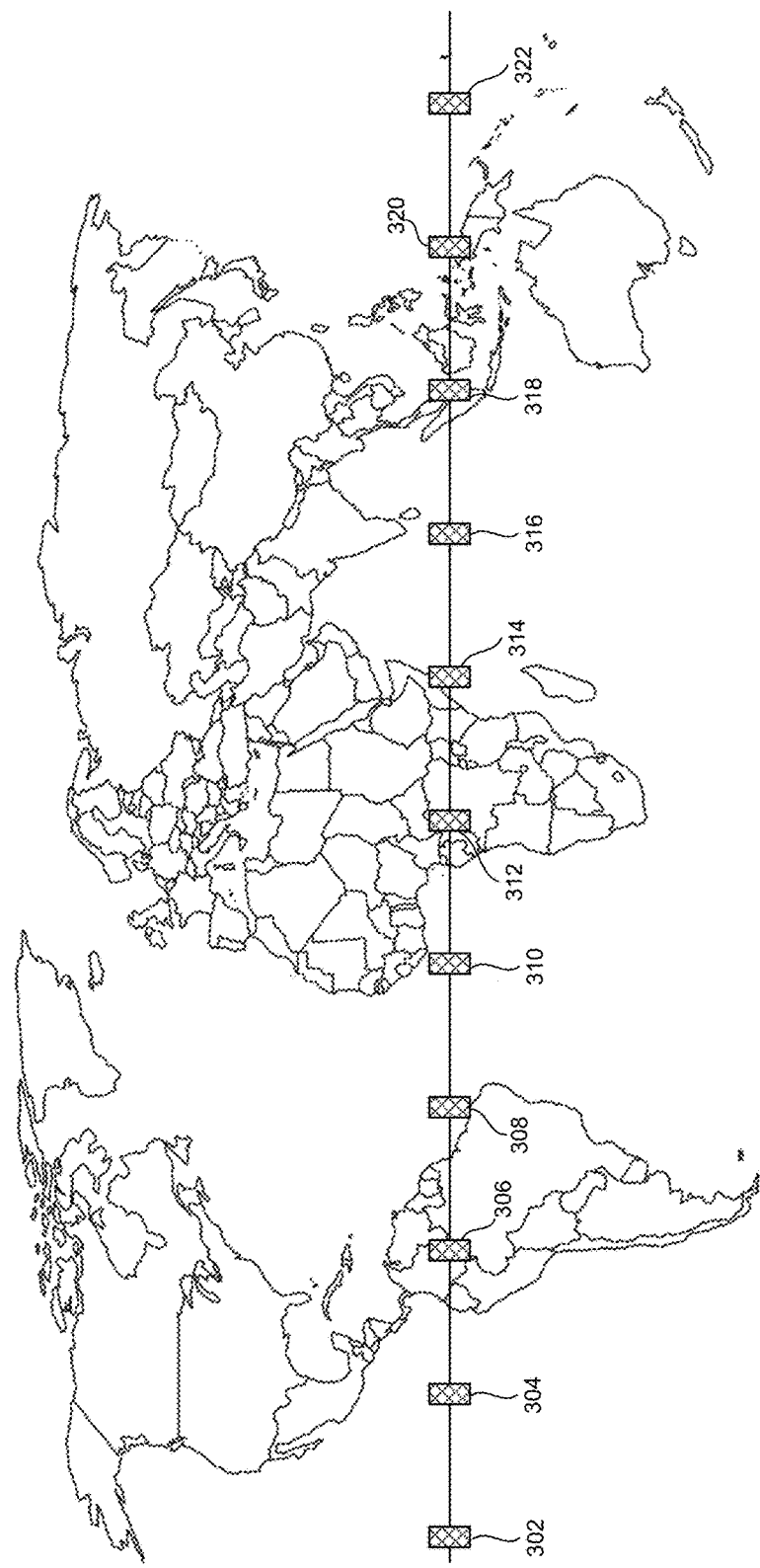
FIG. 4 is a map of the world, showing a constellation of non-geostationary satellites.

In one embodiment, satellite 201 is only one satellite of a larger constellation of satellites that implement the satellite communication system. In one example embodiment, the satellite constellation includes eleven satellites, with each satellite having the same structure as satellite 201. However, each of the satellites can be independently programmed to implement the same or different time domain beam hopping plans, as will be explained below. FIG. 4 is a map of the world showing eleven MEO satellites 302, 304, 306, 308, 310, 312, 314, 316, 318, 320, and 322. In one embodiment, all eleven satellites are in orbit about the Equator. In one example, all eleven satellites are moving in the same orbital direction along the same orbital path and are equally spaced apart from each other. Because the satellites are in MEO orbit, they are non-geostationary, meaning that they will move with respect to any location on the Earth. As the satellites move in orbit, the user and gateway spot beams' coverage areas will drift across the Earth's surface with the satellites. In one example, there will be a drift rate of 360 degrees longitude every six hours, or one degree per minute. In such embodiment, each satellite will orbit past the same earth position in six hours, or four times a day. In one embodiment, the time it takes to drift the width of a spot beam covering subscriber terminals (one of the two hundred beam hopping spot beams) is approximately 2.8 minutes (168 seconds).

Figure 5:
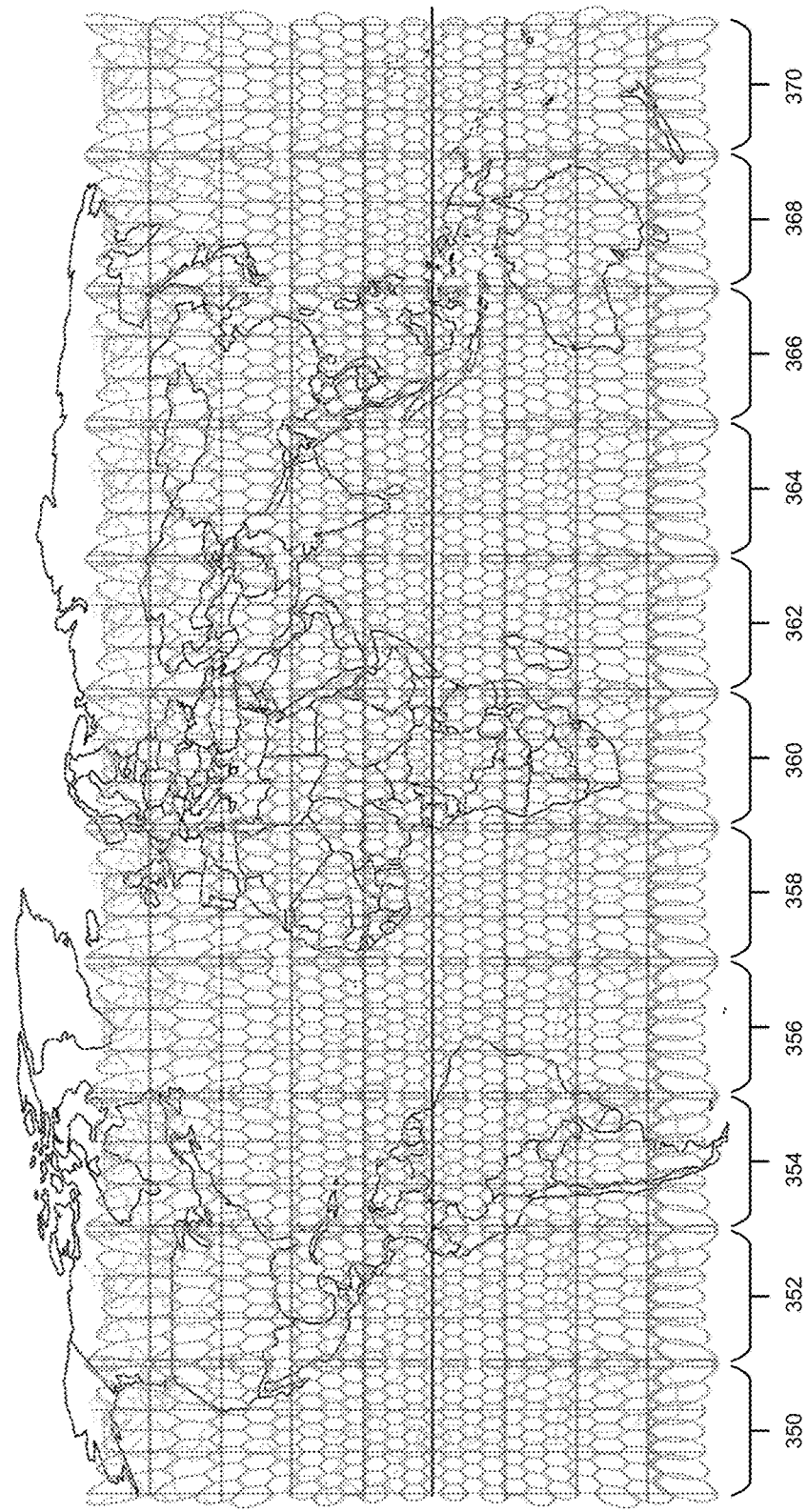
FIG. 5 is a map of the world, showing the beam maps for eleven non-geostationary satellites.

FIG. 5 shows the same map of the world as FIG. 4, with the beam maps (the Field of Regard) for each of the satellites depicted over the map. For example, satellite 302 projects beam map 350, satellite 304 projects beam map 352, satellite 306 projects beam map 354, satellite 308 projects beam map 356, satellite 310 projects beam map 358, satellite 312 projects beam map 360, satellite 314 projects beam map 362, satellite 316 projects beam map 365, satellite 318 projects beam map 366, satellite 320 projects beam map 368, and satellite 322 projects beam map 370. Note that the satellites 302-322 are constantly moving west to east; therefore, beam maps 350-370 are also moving west to east, and are never stationary (in one embodiment). As can be seen, adjacent satellites have adjacent beam maps and adjacent Fields of Regard when operating the satellites. In one embodiment, the beam maps of adjacent satellites overlap so that among the constellation's satellites there is continuous coverage around the globe; however, there may be gaps in coverage at the north and south poles (where there is little demand). That is, the beam map of each satellite is adjacent to a beam map on the adjacent satellite to provide a composite beam map that circumnavigates the Earth.

Figure 6:
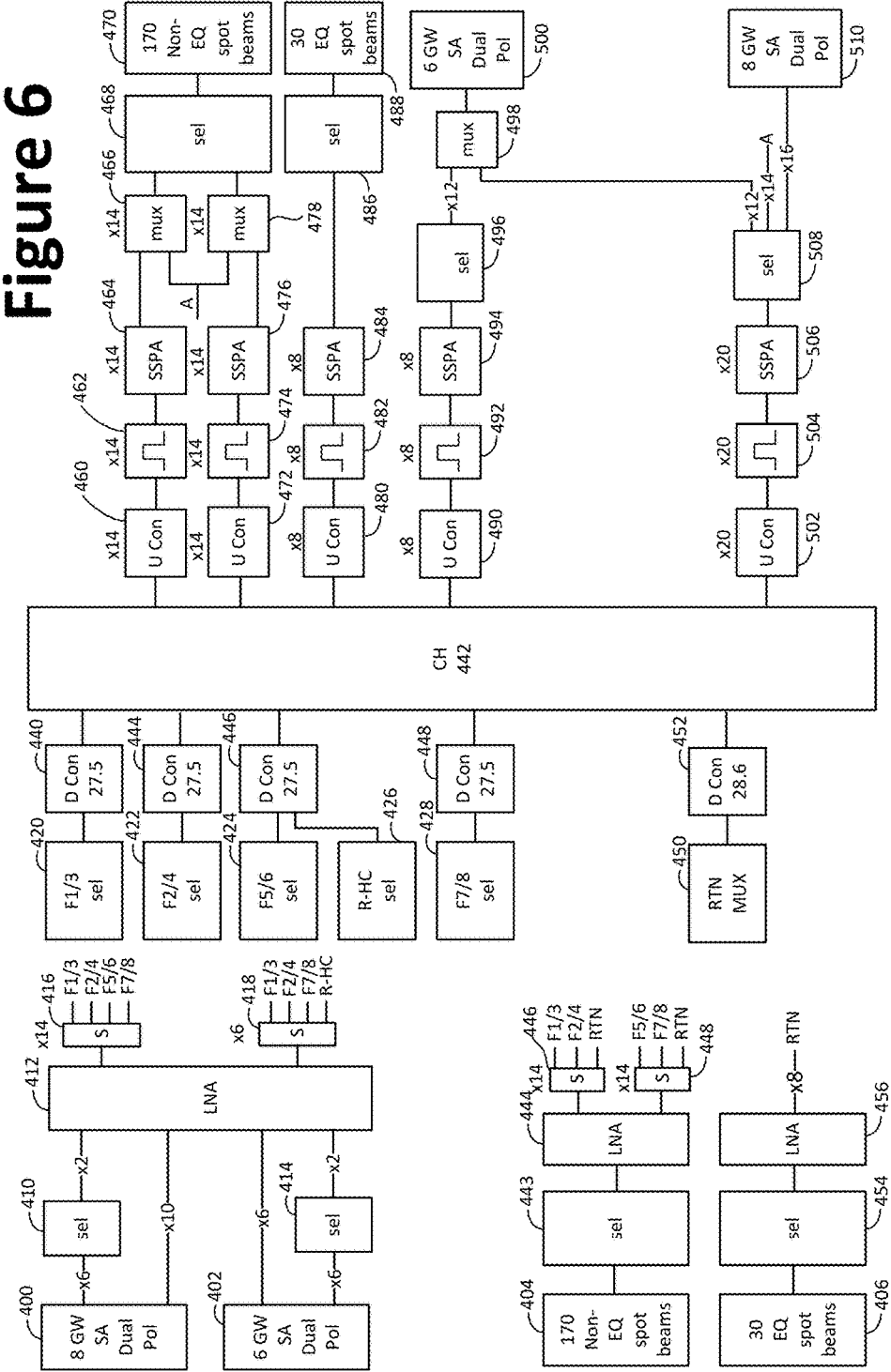
FIG. 6 is a block diagram of one embodiment of a communications payload for a non-geostationary satellite.

FIG. 6 is a block diagram of one embodiment of a communications payload for non-geostationary satellite 201. In one embodiment, each of satellites 302-322 implement the same structure and design of satellite 201; therefore, the payload of FIG. 6 will be implemented on each of satellites 302-322. Traditionally, the communications path from the gateway to the subscriber terminal via the satellite is referred to as the forward path and the communications path from the subscriber terminals to the gateway via the satellite are referred to as the return path. When a satellite is used to provide connectivity to the Internet, a user at a computer connected to a subscriber terminal will send a request for content on the Internet to the gateway via the satellite, and the gateway will provide, in response to that request, access onto the Internet. The response from the Internet will be provided to the gateway, and then forwarded onto the subscriber terminal via the satellite.

The structure of FIG. 6 implements both the forward path and the return path. The uplink beams are received at the left-hand portion of the components of FIG. 6 and the downlink beams are provided at the right-hand edge of the components of FIG. 6. For example, FIG. 6 shows eight gateway steerable dual polarization antennas 400 and six gateway/high capacity subscriber terminal steerable antennas with dual polarization 402 for receiving uplink beams. FIG. 6 also shows the two hundred non-articulated spot beams divided into two groups: one hundred and seventy spot beams 404 illuminating areas away from the Equator and thirty spot beams 406 illuminating areas at the Equator.

The eight 4.2 degree gateway steerable spot beams 400 provide sixteen signals, eight in each polarization (left hand/right hand or horizontal/vertical). Six of those sixteen signals are provided to selection matrix 410 which includes a set of switches that selects two of the six input signals and provides those two selected signals to low noise amplifier 412. Ten of the 16 dual polarization signals from antennas 400 are applied directly to low noise amplifier bank 412 comprising low noise amplifiers. Note that the antennas 400 of FIG. 6 correspond to antennas 270-284 of FIG. 2. Similarly, antennas 402 of FIG. 6 correspond to antennas 286-296 of FIG. 2. The six gateway steerable antennas 402 provide 12 signals (six signals in two polarizations). Six of those signals are provided directly to low noise amplifier bank 412, the other six signals are provided to a 6:2 selection matrix 414, which chooses two of the signals to provide to low noise amplifier bank 412. Note that the satellite payload will include a processor (not depicted) which controls each of the selection matrices described herein. Alternatively, satellite bus will include a processor that will control the selection matrices. As described above, low noise amplifier bank 412 has 20 input signals and, therefore has 20 output signals. Fourteen of the signals output from low noise amplifier bank 412 are provided to separate splitters 416. That is, there are 14 splitters 416. Each splitter splits the incoming signal into four copies noted as: F1/3, F2/4, F5/6 and F7/8. The other six outputs from LNA 412 are provided to a different set of splitters 418 that split the signal to four copies labeled as: F1/3, F2/4, F7/8 and R-HC. The seven outputs of the splitter that started with an F are part of the forward path. The one output of the splitter 418 that is labeled R-HC is part of the return path from a steerable high capacity spot beam used to connect to subscriber terminals. In one embodiment splitters 416 and 418 include filters for passing the frequency bands of the labeled output and stopping all other frequencies.

After the splitters 416 and 418, the signals are sent to appropriate matrices 420, 422, 424, 426 and 428 in order to select which bands to use. Selection matrix 420 receives the signal F1/3. Selection matrix 422 receives signal F2/4. Selection matrix 424 receives signal F5/6. Selection matrix 426 receives signal R-8C. Selection matrix 428 receives F7/8. Eleven signals of the output of selection matrix 420 are provided to down converter 440, which provides its output to channel 442. The 11 signals of the output of selection matrix 422 are provided to down converter 444, which provided its output to channelizer 442. The output of selection matrix 424 includes seven signals that are provided to down converter 446, which provides its output to channelizer 442. The output of selection matrix 426 includes six signals that are provided to down converter 446, which provides its output to channelizer 442. The output of selection matrix 428 includes 11 signals that are provided to down converter 448, which provides its output to channelizer 442. Each of the selection matrices includes a series of programmable switches to route a subset of inputs to the output ports.

The one hundred and seventy non-Equatorial spot beams 404 are provided to selection matrix 443 which chooses twenty-eight out of the one hundred and seventy spot beams. That is, one beam from each of 28 beam hopping groups (discussed below) is chosen. Those 28 signals are sent to low noise amplifier 444. Half of the signals output from low noise amplifier 444 are provided to splitters 446. The other half of the signals are provided to splitters 448. Each of the fourteen splitters 446 make three copies of the signal and output those three copies as F1/3, F2/4 and RTN. Each of the fourteen splitters 448 make three copies of their respective incoming signals and output them F5/6, F7/8 and RTN. Note that the signals F1/3, F2/4, F5/6 and F7/8 are part of the forward path representing communication from a gateway in one of the one hundred and seventy hopping beams. The signal RTN is part of the return path, from subscriber terminals. Note that in some embodiments, each of the splitters has appropriate band pass filters. In some embodiments, each of the selection matrices has appropriate band pass filters at respective inputs and/or outputs.

FIG. 6 shows the thirty non-articulated beam hopping spot beams near the Equator being provided to selection matrix 454. The eight selected signals are provided to low noise amplifier 456 which outputs a signal labeled RTN. Note in some embodiments, each of the low noise amplifiers 456, 444 and 412 have band pass filters at their input and/or output. Additionally, band pass filters can be used at each of the antennas 400, 402, 404 and 406. Based on the output of splitters 448 and low noise amplifier 456, thirty-six signals labeled RTN are frequency combined in MUX 450 which outputs 9 signals. The output of MUX 450 is provided to down converter 452. The output of down converter 452 is provided to channelizer 442. Each of the selection matrices 410, 414, 420, 422, 424, 426, 428, 443 and 454 includes switches that are used to switch throughput among the various spot beams in the hopping groups or among various bands from the gateways and high capacity steerable spot beams. The chosen signals are provided to channelizer 442 which is used to route spectrum between the uplinks and downlinks. In one embodiment, channelizer 442 is a digital channelizer that is fully programmable in orbit. More details of channelizer 442 are provided below with respect to FIG. 7. Channelizer 442 can be thought of as a giant switching or routing matrix that is fully programmable. FIG. 6 shows that channelizer 442 provides fourteen outputs to upconverter 460, fourteen outputs to upconverter 472, eight outputs to upconverter 480, eight outputs to upconverter 490 and twenty outputs to upconverter 502. Note that upconverters 460, 472, 480 and 490 (all which function to increase the frequency of the signal) are provided as part of the forward path, while upconverter 502 is provided for the return path. The output of each of the 14 up converters 460 are provided to filters 462. The output of each of the fourteen filters 462 are provided to solid state power amplifiers (SSPA) 464. The output of each of the fourteen SSPAs are provided to multiplexer 466. The output of multiplexer 466 is provided to 28:170 selection matrix 468. The 170 outputs of selection matrix 468 are provided as the one hundred and seventy non-Equatorial non-articulated beam hopping spot beams 470.

The output of the fourteen upconverters 472 are provided to separate filters 474. The output of each of the fourteen filters 474 is provided to separate SSPAs 476. The output of each of the fourteen SSPAs 476 are provided to multiplexer 478. The output of multiplexer 478 is provided to selection matrix 468. The output of the eight upconverters 480 are provided to filters 482. The output of the eight filters 482 are provided to separate SSPAs 484. The output of SSPAs 484 are provided to selection matrix 486. The output of selection matrix 486 is provided as the thirty Equatorial region non-articulated beam hopping spot beams of 488. Note that the SSPAs can be turned off (e.g., when the satellite is over the ocean or other non-inhabited area) to conserve power.

The output of upconverters 490 (which can be part of the forward path or the return path) are provided to filters 492. The output of the eight filters 492 are provided to SSPAs 494. The output of the eight SSPAs 494 are provided to selection matrix 496. The 12 output signals from selection matrix 496 are provided to multiplexor 498. The output of multiplexor 498 are provided as the six 2.8 degree gateway/ high capacity subscriber terminals steerable spot beams, with dual polarization.

The output of upconverters 502 are provided to separate filters 504. The output of the twenty filters 504 are provided to separate SSPAs 506. The output of the 20 SSPAs 506 are provided to selection matrix 508, which provides 42 outputs. Twelve of the 42 outputs are provided to multiplexer 498, fourteen of the 42 outputs are provided to multiplexer 466 and multiplexer 478, and sixteen of the 42 outputs are provided as the eight gateway steerable dual polarization spot beams described above.

In an alternative embodiment, many or all of the selection matrices can be eliminated by having the selection/switching performed by channelizer 442. In some embodiments, the payload of FIG. 6 can be fully implemented by just a channelizer that will switch, route and filter. Such a channelizer may be configurable for a range of different conditions so that a generic channelizer may be configured for a given application. For example, a channelizer may be configurable to route a relatively large number of low-capacity communication channels or a relatively small number of high-capacity communication channels.

Figure 7:
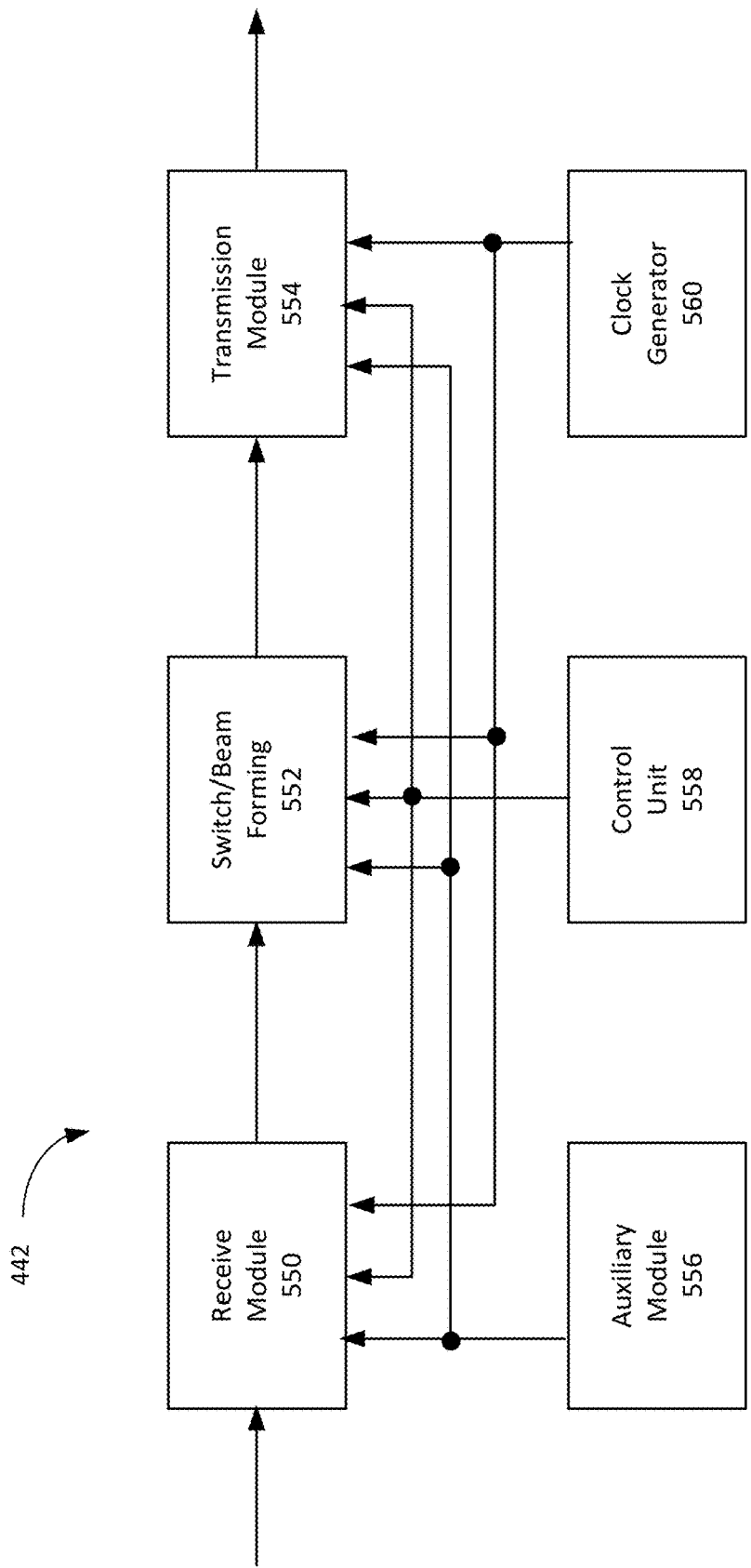
FIG. 7 is a block diagram of one embodiment of a digital channelizer.

FIG. 7 is a block diagram describing one example implementation of channelizer 442. The technologies described herein are not limited to any one particular architecture or implementation of channelizer 442. The embodiment of FIG. 7 is only one example that is suitable for the technology described herein and many other configurations are also usable. Inputs to channelizer 442 are provided to a receive module 550, where signals can be filtered, amplified, stored or simply received. The output of receive module 550 is provided to switch network and beam forming network 552. The output of switch network and beam forming network 552 is provided to a transmission module 554 which provides the outputs of channelizer 442. Channelizer 442 also includes an auxiliary module 556, control unit 558 and clock generator 560, which are all connected to receive module 550, switch network/beam forming network 552 and transmission module 554. In one embodiment, control unit 558 includes one or more processors used to program the switch networks/beam forming network 552. Clock generator 560 provides a clock signal to implement timing within channelizer 442. In one embodiment, auxiliary module 556 is used to control the switches of the switching network, adjust beams, provide spectrum analysis and provide uplink and downlink modems.

Figure 8:
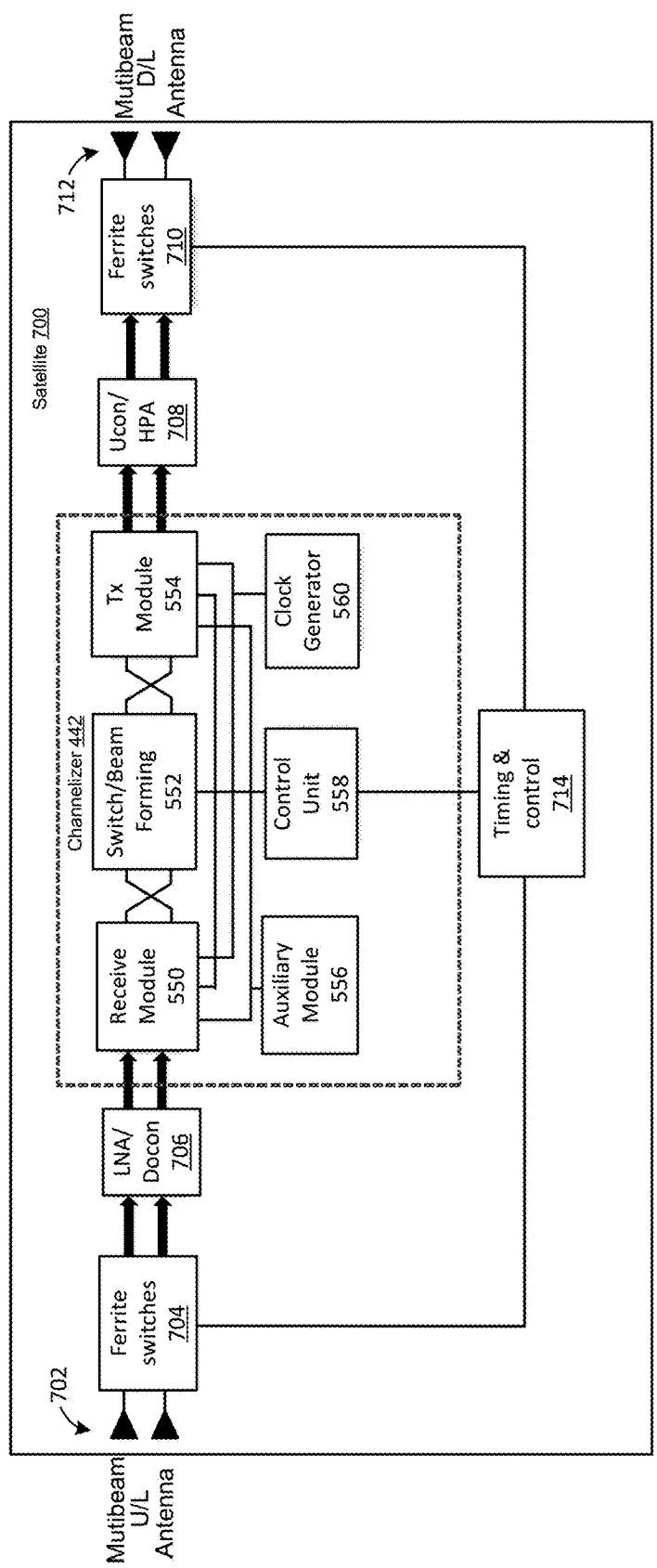
FIG. 8 is a block diagram of a satellite containing a digital channelizer.

FIG. 8 is a block diagram similar to FIG. 7, showing how channelizer 442 may be integrated with other components in a satellite 700. Antennas 702 may be multibeam uplink antennas that receive RF communications from one or more gateways and sent RF communications back to one or more gateways. Ferrite switches 704 provide high-speed switching of RF signals between individual beams generated by antennas 702 (other RF switches may be used instead of Ferrite switches in other examples). Low noise amplifier (LNA) and downconverter 706 amplifies RF signals from ferrite switches 704 and reduces RF frequency before sending RF signals to receive module 550 of channelizer 442. At the output side (right side) of channelizer 442, upconverter/high power amplifier (HPA) 708 receives output from transmission module 554. Upconverter/HPA 708 increases RF frequencies and amplifies RF signals, which are then sent to ferrite switches 710. Ferrite switches 710 switch RF signals between individual beams of antennas 712. Antennas 712 may be multibeam downlink antennas that direct RF signals to subscriber terminals. Timing and control circuit 714 provides a clock signal to ferrite switches 704, channelizer 442 and ferrite switches 710. This allows synchronization between these components so that channelizer 442 routes data in synchronization with switching by ferrite switches 704, 710.

While FIG. 8 shows receive module 550 in block form, it will be understood that receive module 550 and transmit module 554 may include multiple components and there may be multiple receive and/or transmit modules in a channelizer. For example, receive module 550 may include multiple input ports that receive inputs from different beams and/or antennas and may include circuits related to receiving and processing such data (e.g. filters, sampling circuits, etc.), which may be referred to as "receivers" and may be shared by input ports. Similarly, while transmission module 554 is shown in block form, transmission module 554 may include multiple output ports that provide outputs to different beams and/or antennas and may include circuits related to processing and transmitting such data (e.g. amplifiers, multiplexers, etc.), which may be referred to as "transmitters" and may be shared between output ports. In general, switch network and beam forming network 552 directs received data from input ports of receive module 550 to output ports of transmission module 554 under the direction of control unit 558. Specifically, control unit 558 may use routing tables to direct data traffic through switching network and beam forming network 552. Routing tables may link input ports to output ports. In some cases, an individual input port may support multiple subchannels so that input received on such an input port is divided into subchannels that may then be separately routed (i.e. subchannels received at the same input port may be routed to different output ports). Such routing may be quite complex when there are large numbers of subchannels per input port and a large number of input and output ports. This can result in large routing tables that require significant storage space.

Figure 9A:
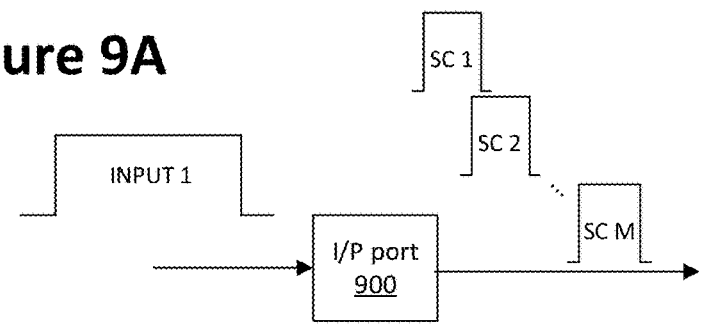
FIGS. 9A-D illustrate operation of an input port of a channelizer.

FIG. 9A shows how an input port 900 (e.g. an input port in a receive module such as receive module 550 of FIGS. 7 and 8) may support multiple subchannels. The term "input port" is used here to refer to the physical connecting structure (e.g. physical port including multiple electrical conductors arranged to connect with an external component such as an antenna) and related receiver circuits. RF input is received by input port 900 as Input 1, e.g. from an RF uplink from a ground station received by an antenna. Input 1 may have a wide bandwidth that is split up by input port 900 into subchannels SC_1-SC_M, which have narrower bandwidths. Thus, for example, where Input 1 has a bandwidth of 100 MHz, M may be 100, and each subchannel SC_1-SC_M may have a bandwidth of 1 MHz, or M may be 200 and each subchannel SC_1-SC_M may have a bandwidth of 0.5 MHz. An input such as Input 1 may be divided by filtering selectively to isolate each desired bandwidth. Additionally, input port 900 may sample signals for each subchannel to provide SC_1-SC_M as digital samples.

Figure 9B:
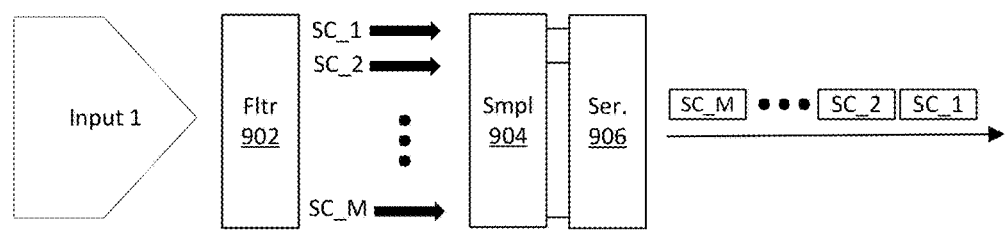

FIG. 9B provides a conceptual illustration of some operations of an input port such as input port 900. While FIG. 9B shows filtering followed by sampling, in some examples data is first digitized and then filtered. Input 1 is received and is filtered by an array of filters 902 into subchannels SC_1-SC_M according to frequency, i.e. array of filters 902 divides Input 1 into M subchannels of different frequencies. Sampling circuits 904 sample the subchannels SC_1-SC_M to provide digital output representing each subchannel at a sampling time to serializer 906, which converts parallel samples to a serial stream. The digital output may be provided in serial form as shown. Thus, while sampling of all subchannels may occur in parallel, sampled data from different subchannels may be output in series. This may be reversed by an output port where different subchannels may be multiplexed.

Figure 9C:
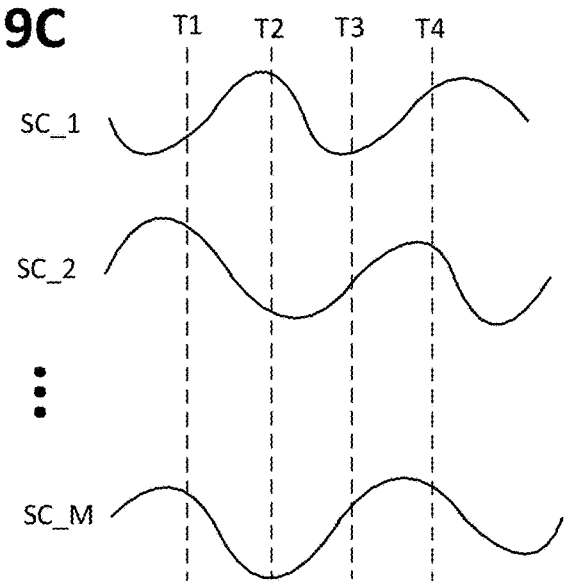

FIG. 9C illustrates an example of how subchannels SC_1 to SC_M may be sampled at a series of sampling times T1-T4. A set of subchannel samples for a given sampling time may be referred to as a "frame" so that the data obtained from subchannels SC_1-SC_M at time T1 may be considered samples of a first frame, data obtained from subchannels SC_1-SC_M at time T2 may be considered samples of a second frame, data obtained from subchannels SC_1-SC_M at time T3 may be considered samples of a third frame, and so on. Frame data may be sent sequentially in the same order in which sampling occurs and data within a frame may be sent sequentially also (e.g. as illustrated in FIG. 9B). For example, sampled data of a frame may be buffered in parallel and then read out in series. Sampling of RF signals to provide digital samples may be considered a form of analog-to-digital conversion with subsequent processing of digital samples in the channelizer being digital so that a switching network in such a channelizer may be digital.

Figure 9D:
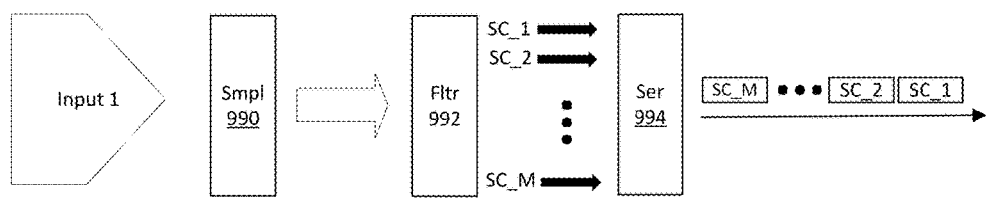
Figure 10:
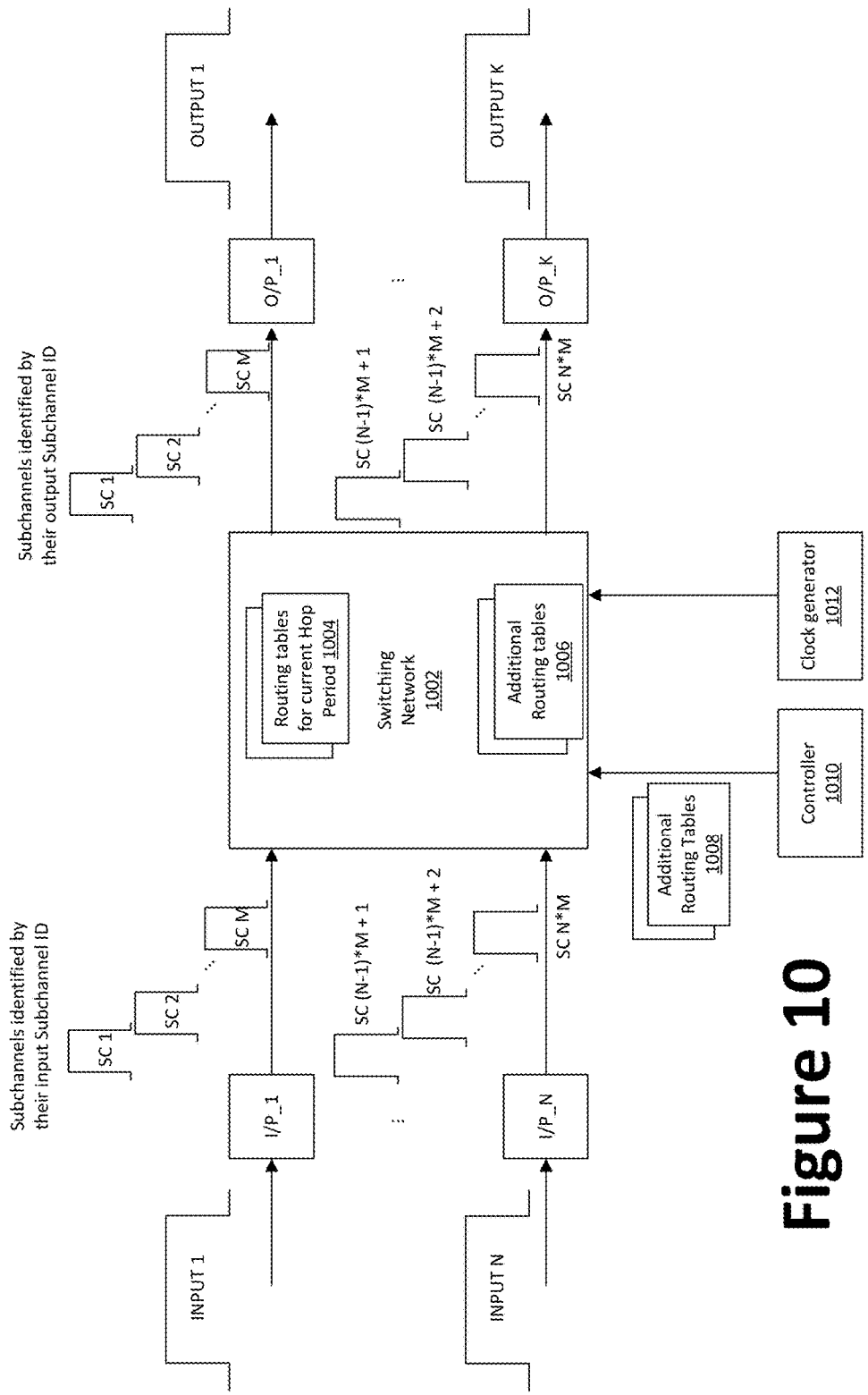
FIG. 10 illustrates operation of a channelizer.

FIG. 9D shows a different conceptual illustration of some operations of an input port such as input port 900. In this example, in contrast to the example of FIG. 9B, Input 1 is sampled first by sampling circuits 990 and is subsequently digitally filtered by filters 992 into subchannels SC_1-SC_M according to frequency, i.e. array of digital filters 992 divides digital samples into M subchannels of different frequencies. Serializer 994 serializes data from subchannels SC_1-SC_M to provide digital a combined output as a serial stream. Thus, while sampling of all subchannels may occur in parallel, sampled data from different subchannels may be output in series. This may be reversed by an output port where different subchannels may be multiplexed FIG. 10 illustrates an example of a channelizer (for example a channelizer like channelizer 442 discussed above, embodied in a satellite payload) that has N input ports, I/P_1-I/P_N, where N may be two or more (in other examples, a single input port may be used). Each input port, I/P_1-I/P_N, supports M subchannels, so that the total number of subchannels supported by the N input ports, I/P_1-I/P_N, is M*N. Thus, input port I/P_1 supports subchannels SC_1-SC_M, while input port I/P_N supports subchannels SC_(N−1)*M+1-SC_N*M. Digital samples for a given frame are provided by input ports I/P_1-I/P_N to switching network 1002, which uses the routing tables 1004 for the current hop period (or active hop period) to route subchannel data from input ports, I/P_1-I/P_N, to output ports, O/P_1-O/P_K Output ports O/P_1-O/P_K each support M subchannels. Thus, each of the K output ports, O/P_1-O/P_K, receives sampled data corresponding to M subchannels for a total of M*K output subchannels, shown as SC_1-SC_M*K. The number of input subchannels M*N and output subchannels M*K may be the same or may differ. It will be understood that subchannel data may be routed in any manner between input ports and output ports and that similarly numbered input and output subchannels are not necessarily the same (i.e. input subchannel SC_X does not necessarily map to output subchannel SC_X). Subchannel numbers on the left of switching network 1002 refer to input subchannel IDs (or "receive subchannel IDs") while subchannels on the right of switching network 1002 refer to output subchannel IDs (or "transmit subchannel IDs").

Input subchannels may map to output subchannels in different patterns at different times according to routing tables. For example, routing tables 1004 may include a set of routing tables for a current hop period of a beam hopping scheme. Such a set of routing tables may be used in sequence during a hopping period, and may be repeated during subsequent hopping periods or switched to a different set of routing tables. Routing tables for a current hop period may be maintained in a high-speed memory such as Random Access Memory (RAM) or other volatile memory within switching network 1002. Additional routing tables 1006 are provided in switching network 1002. Additional routing tables 1006 may include routing for one or more hopping periods other than the current (active) hopping period. For example, additional routing tables 1006 may include a set of routing tables for a next hopping period. Additional routing tables 1006 may be maintained in high-speed memory or may be maintained in a memory that allows them to be rapidly loaded into high-speed memory (e.g. on-chip memory) when they are active or about to become active.

Additional routing tables 1008 are maintained outside switching network 1002. For example, additional routing tables 1008 may include one or more additional sets of tables for one or more additional hopping periods that are not active and are not about to become active. Additional routing tables 1008 be maintained in a non-volatile memory in a channelizer or elsewhere (e.g. in a shared data storage structure outside of the channelizer). Storing a large number of routing tables, each with a large number of entries may require significant storage.

Controller 1010 controls operation of switching network 1002. For example, controller 1010 selects a set of tables for a current hopping period and manages transitions between sets of tables from hopping period to hopping period. Controller 1010 may control loading of a set of routing tables into high-speed memory when the set of routing tables is the next active set. Controller 1010 may be substantially similar to control unit 558 of FIGS. 7 and 8.

Clock generator 1012 provides one or more clock signals to switching network 1002. Clock generator 1012 may be substantially similar to clock generator 560 of FIGS. 7 and 8 and may receive an input from an external timing and control unit (e.g. timing and control unit 714) that ensures that clock signals provided to switching network 1002 are synchronized with synchronization signals sent to other components such as ferrite switches, etc.

FIG. 11 illustrates how a beam hopping scheme may be implemented over multiple hopping periods (hopping period 0, hopping period 1, and so on) with each hopping period spanning multiple epochs (N epochs, epoch0-epochN, in this example). For example, hopping periods of FIG. 11 may be implemented by a channelizer as described above (e.g. channelizer 442). In some embodiments, the hopping period is completely configurable and programmable while the satellites are in orbit. After N epochs of a hopping period, the next hopping period is performed. In some embodiments, consecutive hopping periods will perform the same hopping plan (e.g., the same assignment of spot beams to epochs) until a satellite is programmed to change hopping plans (e.g., because demand has changed). During each hopping period, only one spot beam of each hopping group is active. Therefore, only a portion of the Field of Regard is active. Those spot beams that are active are referred to as the Field of View. As the number of active spot beams is less than the total number of spot beams in the beam map, each of non-geostationary satellites 302-322 has a Field of Regard that is greater than its Field of View at any instance in time.

As discussed above, each of satellites 302-322 provide a plurality of spot beams as the satellites move across the planet surface. In order to perform the time domain beam hopping, the spot beams may be divided into hopping groups. The satellite uses digital channelizer as described, or otherwise, to perform the time domain beam hopping. FIG. 12 is a flowchart describing one embodiment of a process of a satellite performing the time domain beam hopping. In step 670, the satellite reconfigures the selection matrices to route power and make a connection to the applicable gateway beam to a next set of beams in the hopping groups according to the current hopping plan (in some cases, this may be performed by a channelizer using routing tables). In step 672, the satellite will enable communication during epoch 0 (see FIG. 11), only sending power and making gateway connection to the predetermined subset of beams in each group. In step 674, the satellite will reconfigure the selection matrices (or routing tables) to route power to the next set of beams in the hopping groups according to the current hopping plan. In step 676, the satellite will communicate during epoch 1, only sending power to a predetermined set of beams in each hopping group according to the hopping plan. In step 678, the satellite will reconfigure the selection matrices (or routing tables) to route power to the next set of spot beams in the hopping groups according to the current hopping plan. In step 680, the satellite will enable communication during epoch 2, only sending power to a predetermined subset of beams in each hopping group. This process will continue for each epoch, as depicted in FIG. 11, until the last epoch (designated as epoch N in FIG. 11). In step 682, the satellite will reconfigure the selection matrix (or routing tables) to route power to the next hopping group beam sequence according to the current hopping plan. In step 684, the satellite will allow communication during epoch N, only sending power to a predetermined subset of beams in each hopping group. In step 686, the satellite can (optionally) access a new hopping plan that takes into account movement of the non-geostationary satellite. In step 688, the new hopping plan is loaded and becomes the current hopping plan, such that the process continues to step 670. Thus, the process of FIG. 12 describes the operation of the non-geostationary satellite performing time domain beam hopping during a hopping period. In one embodiment, the hopping plan can change at the end of each hopping period. In other embodiments, the hopping plan can change after a fixed number or dynamic number of hopping periods. In other embodiments, the hopping period can change after any hopping period; however, there is no requirement that a hopping plan change after any hopping period.

In one example embodiment, the hopping period is 90 seconds and an epoch is 1.286334 milliseconds. In this embodiment, the time for a spot beam to drift completely across a subscriber terminal is approximately 2 hopping periods (168 seconds).

Figure 13:
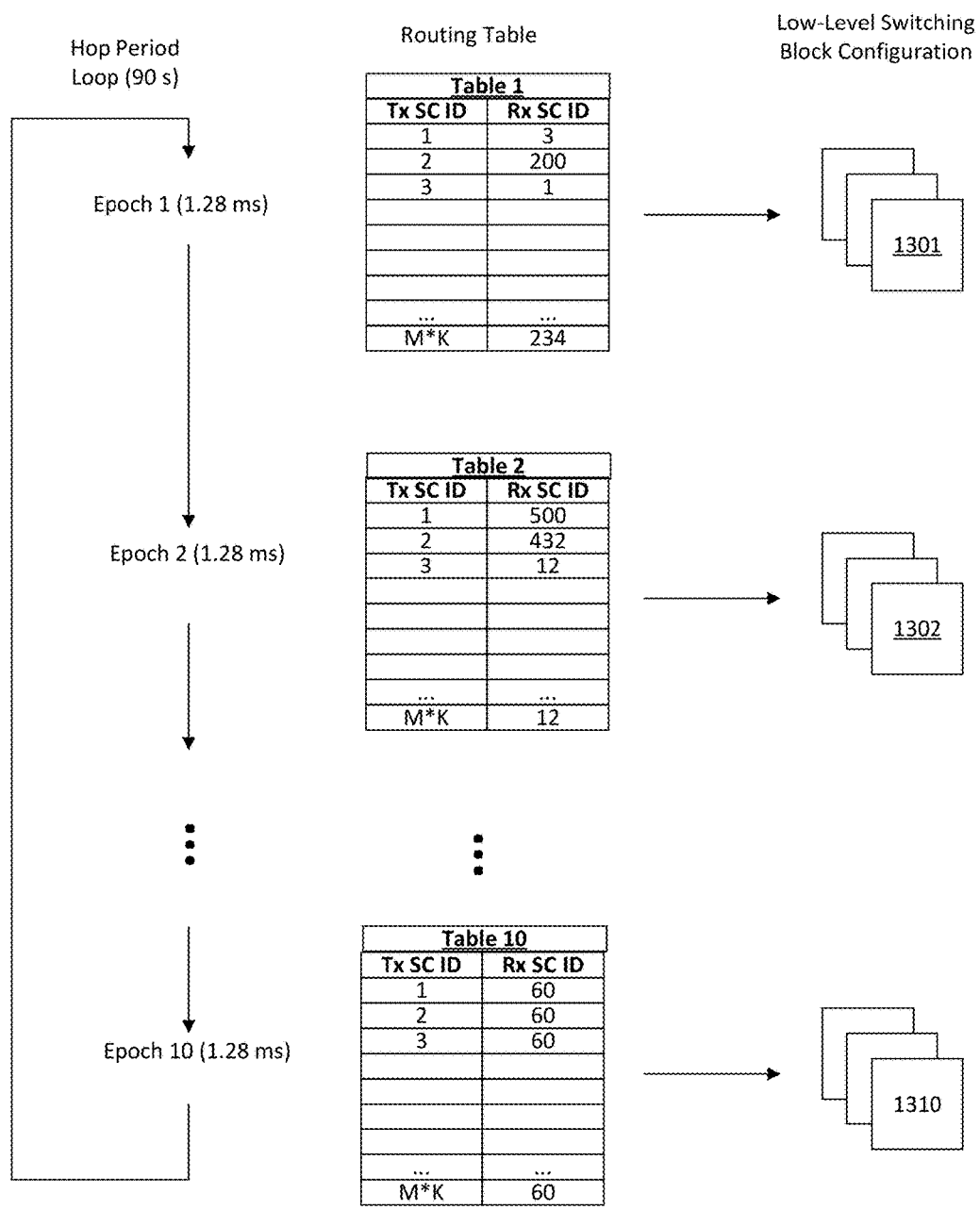
FIG. 13 shows routing tables that route individual subchannels.

FIG. 13 illustrates operation of a channelizer (e.g. channelizer 442 of any of the above figures) implementing a beam hopping scheme (e.g. as illustrated in FIGS. 11 and 12). FIG. 13 illustrates different mapping of output (transmit) subchannels ("Tx Sc ID" in left columns of tables) to input (receiver) subchannels ("Rx SC ID" in right columns) over different epochs of a hopping period. For example, in epoch 1, table 1 shows a first entry that links output subchannel 1 with input subchannel 3, a second entry that links output subchannel 2 with input subchannel 200, a third entry that links output subchannel 3 with input subchannel 1, and a final entry (entry M*NK) that links output subchannel M*K with input subchannel 234. Each output subchannel has one entry (i.e. one line in table 1) that links it to a corresponding input subchannel. Implementing the coupling of input subchannels to output subchannels includes generating low-level switching block configurations 1301-1310 (switching configurations) that are applied by switching stages of a switching network. Thus, table 1 may be used to generate switching configurations 1301 that are then implemented by switching stages of a channelizer.

Table 2 shows routing of subchannels in epoch 2. Table 2 includes a first entry that links output (transmit) subchannel 1 with input subchannel 500, a second entry that links output subchannel 2 with input subchannel 432, a third entry that links output subchannel 3 with input subchannel 12, and a final entry (entry M*K) that links output subchannel M*K with input subchannel 12. Thus, all entries shown in table 2 are different to corresponding entries of table 1 so that each of the output subchannels shown is linked to different input subchannels in epochs 1 and 2. Table 2 may be used to generate switching configurations 1302 for switching stages of a channelizer.

Table 10 shows routing of subchannels in epoch 10. Table 10 includes a first entry that links output subchannel 1 with input subchannel 60, a second entry that links output subchannel 2 with input subchannel 60, a third entry that links output subchannel 3 with input subchannel 60, and a final entry (entry M*K) that links output subchannel M*K with input subchannel 60. Thus, all entries shown in table 2 link input subchannel 60, so that input subchannel 60 is broadcast to all output subchannels. Table 10 may be used to generate switching configurations 1310 for switching stages of a channelizer. After epoch 10, the channelizer may return to table 1 and implement another cycle. These cycles continue for a hop period (90 seconds in this example).

Figure 14:
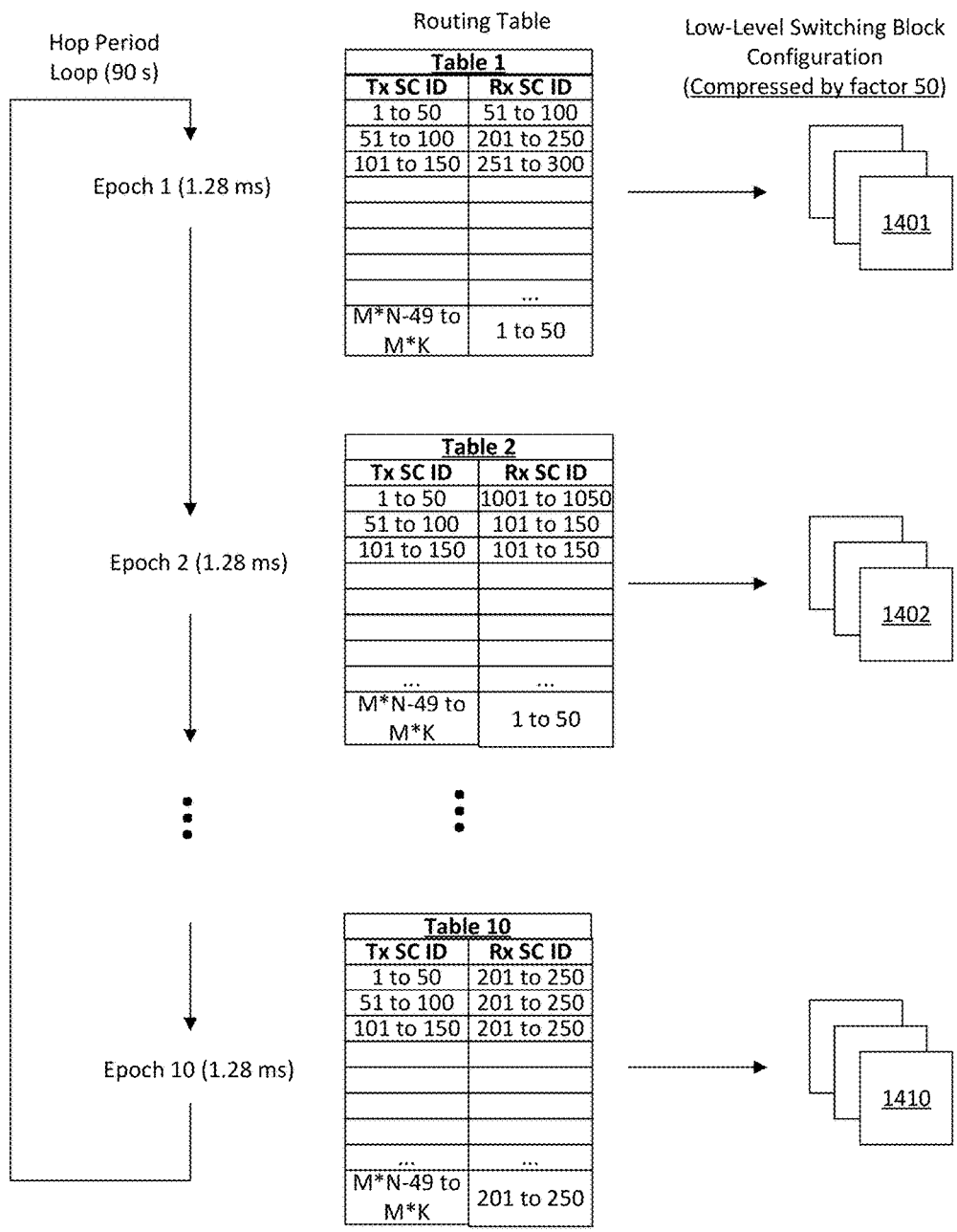
FIG. 14 shows routing tables that route subchannels in groups.

FIG. 14 shows an example of operation of a channelizer (e.g. channelizer 442 of any of the above figures) using compressed routing tables to route subchannels in groups, or sub-bands. (FIG. 14, like the example of FIG. 13 shows a 90 second hop period with 10 epochs of 1.28 ms and M*K subchannels.) In this example, subchannels are grouped into sub-bands, with each sub-band containing 50 subchannels. Rather than containing an entry for each subchannel, Table 1 contains a single entry for output channels 1 to 50, another entry for output subchannels 51 to 100, another entry for output subchannels 101 to 150, and so on to the last entry for output subchannels M*N−49 to M*N. Each input sub-band is mapped to an output sub-band as a unit. Thus, output subchannels are also grouped into sub-bands consisting of 50 output subchannels (e.g. a sub-band consisting of input subchannels 51-100 is mapped to output subchannels 1 to 50). Table 1 may be used to generate switching configurations 1401 that are then implemented by switching stages of a channelizer. Switching configurations 1401 may differ from switching configurations 1301.

Table 2 shows routing of subchannels in epoch 2. Table 2 includes a first entry that links output subchannels 1 to 50 with input subchannels 1001 to 1050, a second entry that links output subchannels 51 to 100 with input subchannel 101 to 150, a third entry that links output subchannels 101 to 150 with input subchannel 101 to 150 and a final entry that links output subchannels M*N−49 to M*N with input subchannels 1 to 50. Table 2 may be used to generate switching configurations 1402 for switching stages of a channelizer.

Table 10 shows routing of subchannels in epoch 10. Table 10 includes a first entry that links output subchannels 1 to 50 with input subchannels 201 to 250, a second entry that links output subchannels 51 to 100 with input subchannel 201 to 250, a third entry that links output subchannels 101 to 150 with input subchannel 201 to 250, and a final entry that links output subchannel M*N−49 to M*N with input subchannels 201 to 250. Thus, all entries shown in table 10 link input subchannels 201 to 250, so that input subchannels 201 to 250 are broadcast to all output sub-bands. Table 10 may be used to generate switching configurations 1410 for switching stages of a channelizer.

It can be seen that tables for grouped subchannels of FIG. 14 may be smaller than corresponding tables for ungrouped subchannels (e.g. as shown in FIG. 13). In this example, where subchannels are grouped into groups of 50 to form sub-bands, tables are reduced by a factor of 50. Different grouping may provide different reduction. Such reduction in table size may allow more individual tables to be stored in high-speed memory where space may be at a premium. For example, a larger number of tables may be provided for a hopping period so that instead of cycling through 10 tables as shown in FIGS. 13 and 14, more than 10 tables may be used (e.g. 50 times as many, or 500 tables for an epoch). Routing tables for more hopping periods may be stored. Additional space in high-speed memory may be used for other purposes also.

Figures 15A, 15B:
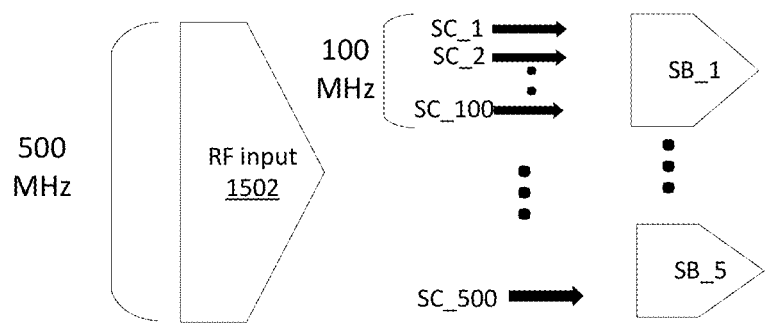
FIGS. 15A-B illustrate an example of subchannels grouped into 5 sub-bands.

FIGS. 15A-B illustrate another example of grouping of subchannels in a channelizer (e.g. channelizer 442 of any of any of the above Figures). FIG. 15A shows an example of a routing table 1500 that routes subchannels in groups of 100 subchannels, where each group of 100 subchannels may be considered a sub-band. Table 1500 indicates the mapping of subchannels to sub-bands as well as mapping of transmit subchannels ("Tx SC ID" of first column) and transmit sub-bands ("TX SB ID" of second column) to receive sub-bands ("Rx SB ID" of third column) and receive sub-channels ("Rx SC ID" of fourth column). For example, transmit (output) subchannels 1 to 100 form transmit sub-band 1, which is mapped to receive (input) sub-band 4, formed by receive sub-channels 301 to 400. Transmit subchannels 101 to 200 form transmit sub-band 2, which is mapped to receive sub-band 3, formed by receive subchannels 201 to 300. Table 1500 may be associated with an epoch of a hopping period. Additional tables with the same number of entries may be associated with other epochs of the hopping period. While table 1500 shows both subchannels and sub-bands for illustration, tables used in a channelizer may be simpler and may use only sub-bands (or only subchannels). Mapping of subchannels to sub-bands does not have to be specified in each table (e.g. a one-time mapping of subchannels to sub-bands may be performed). For example, a table used in a channelizer may be simplified to the two middle columns of table 1500 that show mapping of transmit sub-bands to receive sub-bands.

FIG. 15B provides a conceptual illustration of how an RF input is managed according to table 1500. RF input 1502 may be RF input received by a satellite antenna from a gateway (e.g. a forward uplink) or other source. RF input 1502 has a bandwidth of 500 MHz in this example and is divided into 500 separately sampled subchannels of 1 MHz each (SC_1 to SC_500). For example, an input port may include circuits that provide 500 outputs corresponding to 500 subchannels of different frequencies (by transforming an input as conceptually represented in FIG. 15B). These subchannels are grouped into sub-bands, with subchannels of a sub-band being routed together to the same output port. In this example, a group of subchannels consists of 100 subchannels that form a sub-band. Thus, subchannels 1-100 form sub-band 1, which has a bandwidth of 100 MHz as shown (SC_1 to SC_100 map to SB_1). Other subchannels map to other sub-bands as indicated in table 1500 so that 500 subchannels form 5 sub-bands (SB_1 to SB_5). Routing of such sub-bands may use short tables (i.e. tables that are shorter by a factor of 100 compared with tables used to route subchannels individually).

Figures 16A, 16B:
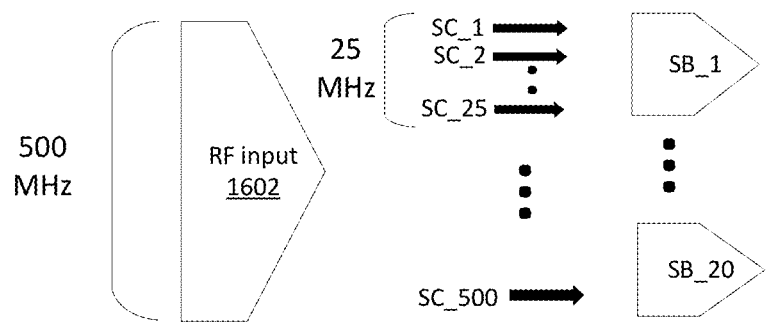
FIGS. 16A-B illustrate an example of subchannels grouped into 20 sub-bands.

FIGS. 16A-B illustrate another example of grouping of subchannels in a channelizer (e.g. channelizer 442 of any of any of the above Figures). FIG. 16A shows an example of a routing table 1600 that routes subchannels in groups of 25 subchannels, where each group of 25 subchannels may be considered a sub-band. Table 1600 indicates the mapping of subchannels to sub-bands as well as mapping of transmit subchannels ("Tx SC ID" of first column) and transmit sub-bands ("TX SB ID" of second column) to receive sub-bands ("Rx SB ID" of third column) and receive sub-channels ("Rx SC ID" of fourth column). For example, transmit subchannels 1 to 25 form transmit sub-band 1, which is mapped to receive sub-band 13, formed by receive sub-channels 301 to 325. Transmit subchannels 26 to 50 form transmit sub-band 2, which is mapped to receive sub-band 11, formed by receive subchannels 251 to 275. Table 1600 may be associated with an epoch of a hopping period. Additional tables with the same number of entries may be associated with other epochs of the hopping period.

FIG. 16B illustrates how an RF input is managed according to table 1600. RF input 1602 may be RF input received by a satellite antenna from a gateway (e.g. a forward uplink) or other source. RF input 1602 has a bandwidth of 500 MHz in this example and is divided into 500 separately sampled subchannels of 1 MHz each (SC_1 to SC_500). For example, a receiver connected to one or more input ports may be conceptually represented as including filtering and sampling circuits that provide 500 outputs corresponding to 500 subchannels of different frequencies. These subchannels are grouped into sub-bands, with subchannels of a sub-band being routed together to the same output port. In this example, a group of subchannels consists of 25 subchannels that form a sub-band. Thus, transmit subchannels 1-25 form transmit sub-band 1, which has a bandwidth of 25 MHz as shown (SC_1 to SC_25 map to SB_1). Other subchannels map to other sub-bands as indicated in table 1600 so that 500 subchannels form 20 sub-bands (SB_1 to SB_20). Routing of such sub-bands may use short tables (i.e. tables that are shorter by a factor of 25 compared with tables used to route subchannels individually).

While specific examples of numbers of subchannels grouped into sub-bands are described above (50 subchannels per sub-band in FIG. 14, 100 subchannels per sub-band in FIGS. 15A-B, and 25 subchannels per sub-band in FIGS. 16A-B) it will be understood that the present technology is not limited to any particular number of subchannels per sub-band. An adaptive channelizer may be configured to manage data in sub-bands ranging from one subchannel to M subchannels, where M is the number of subchannels supported by a receiver connected to one or more input ports. This allows the channelizer to be configured for routing a range of different communications from wide-bandwidth to narrow-bandwidth. The number of subchannels per sub-band may be chosen so that all subchannels of an input port are assigned to sub-bands of equal size (e.g. the number of subchannels per sub-band is M/x, where x is an integer and M is divisible by x). Other schemes of subchannel to sub-band assignment may also be implemented.

Routing tables, such as routing tables of FIGS. 14, 15A, and 16A, may generate switching configurations that are adapted to the switching stages of a particular channelizer and adapted to the grouping of subchannels into sub-bands required. In general, a channelizer includes multiple switching blocks and each switching block contains multiple switching stages in series. Individual switching configurations for switches of each stage may be generated from routing tables to implement the routing indicated by the routing table.

Figure 17:
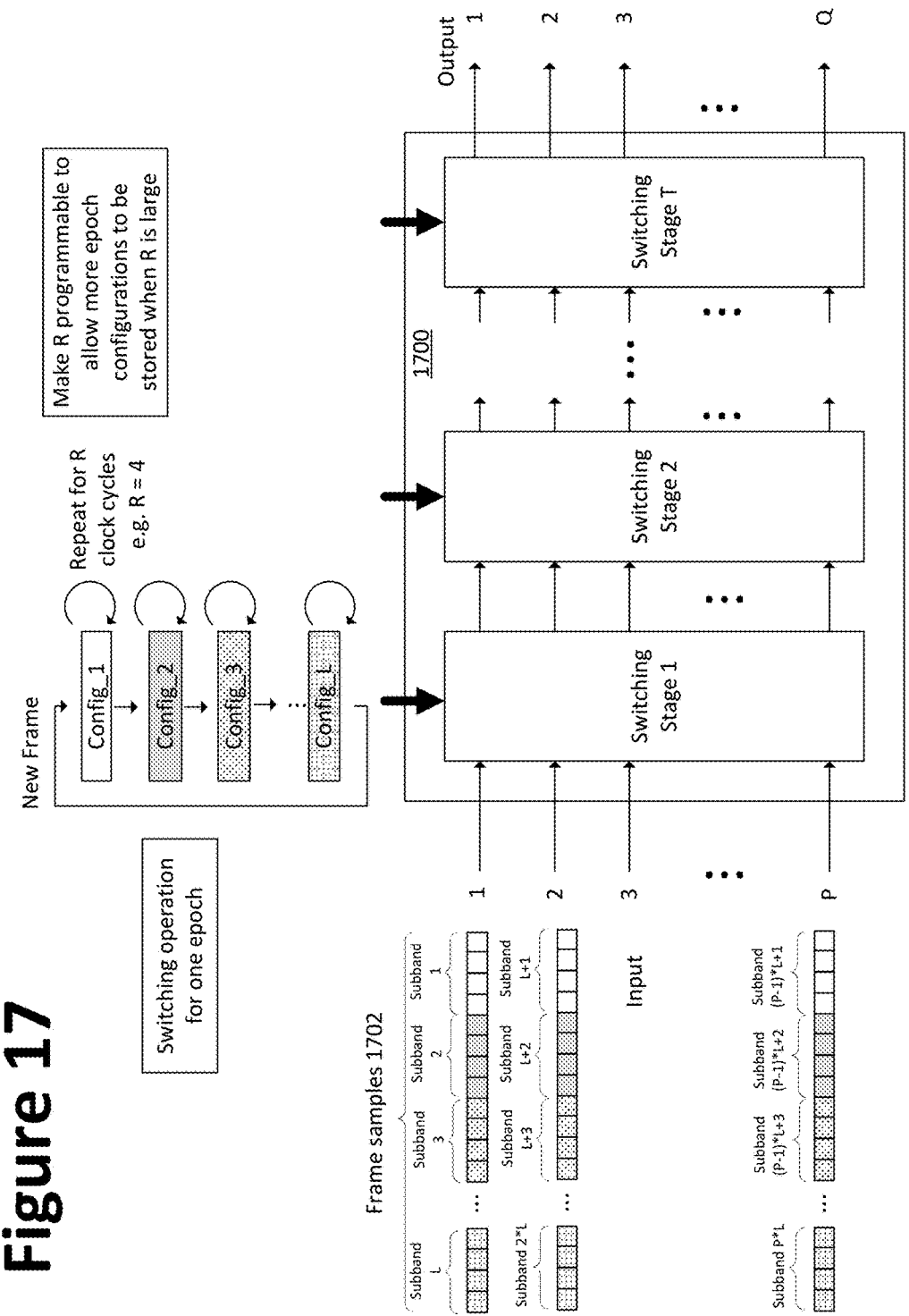
FIG. 17 shows an example of a switching block containing switching stages applying switching configurations that are repeated.

FIG. 17 illustrates certain aspects of how routing of sub-bands may be implemented by switching stages of a switching block 1700 (e.g. in channelizer 442 of any of the above figures). FIG. 17 illustrates how a switching configuration may be applied a number of times in series to route data from different subchannels together. In the example shown, there are four subchannels per sub-band (R=4) and switching configurations are repeated four times for the four samples of a sub-band in a given frame so that these samples are routed together.

Sampled data of a frame, frame samples 1702, are shown arranged according to corresponding channelizer inputs. Here, switching block 1700 has P inputs, inputs 1 to P, and each input receives samples for L sub-bands (i.e. L*R, or 4*L subchannels). Thus, input 1 receives samples for sub-bands 1 to L, input 2 receives samples for sub-bands L+1 to 2L, and so on, with input P receiving samples for sub-bands (P−1)*L+1 to P*L. Frame samples 1702 represent samples obtained at the same time from a large number of subchannels (P*L sub-bands of 4 subchannels each, i.e. 4*P*L subchannels) from one or more receivers of the channelizer, which may each receive input from one or more input ports.

Frame samples 1702 are provided to channelizer 1700 as shown, including providing sub-band 1 samples to input 1 in parallel with providing sub-band L+1 samples to input 2, down to providing sub-band (P−1)*L+1 samples to input P. Each of these sub-bands is routed by switching stage 1 according to a first switching configuration, config_1. In order to route each sample of a sub-band identically, switching configuration config_1 is repeated R times (4 times in this example) over R clock cycles. Thus, in a first clock cycle, the sample data for the first subchannel of sub-band 1, first subchannel of sub-band L+1, down to the first subchannel of sub-band (P−1)*L+1 are switched according to config_1. In a second clock cycle, the sample data for the second subchannel of sub-band 1, second subchannel of sub-band L+1, down to the second subchannel of sub-band (P−1)*L+1 are switched according to config_1. In a third clock cycle, the sample data for the third subchannel of sub-band 1, third subchannel of sub-band L+1, down to the third subchannel of sub-band (P−1)*L+1 are switched according to config_1. In a fourth clock cycle, the sample data for the fourth subchannel of sub-band 1, fourth subchannel of sub-band L+1, down to the fourth subchannel of sub-band (P−1)*L+1 are switched according to config_1. Subsequently, a second switching configuration, config_2, is applied for four successive clock cycles to the samples of the four subchannels of sub-band 2, sub-band L+2, down to sub-band (P−1)*L+2, which are shaded to differentiate from other sub-band samples. Subsequently, a third switching configuration, config_3, is applied for four successive clock cycles to the samples of the four subchannels of sub-band 3, sub-band L+3, down to sub-band (P−1)*L+3. Each switching configuration is repeated for four clock cycles to identically route four subchannel samples of a sub-band, with different sub-bands being differently routed. L switching configurations, config_1 to config_L are applied to samples of a frame. Then, for samples of a subsequent frame, the same series of switching configurations, config_1 to config_L are repeated (i.e. switching configurations are repeated in a cycle once per frame). The cycle is applied for all frames of an epoch. A different set of switching configurations may be applied in a subsequent epoch. For example, a set of tables for a hopping period may include individual tables for each epoch of the hopping period, and each such individual table may generate switching configurations to be applied during that epoch. While R=4 in this example, it will be understood that this can be applied to any number of subchannels per sub-band (e.g. a switching configuration may be applied for 50 or 100 clock cycles where sub-bands are formed of 50 or 100 subchannels).

While switching configurations config_1 to config_L are shown being applied to switching stage 1, it will be understood that additional switching configurations are applied to switching stages 2 to T in a similar manner. In particular, if switching configurations of switching stages 2 to T are each repeated for R clock cycles (four clock cycles in this example) this routes four subchannel samples together through switching stages 2 to T. Thus, sampled data of a given sub-band is routed together through switching stages of a switching block using a reduced number of switching configurations according to the number of subchannels per sub-band. The number of subchannels per sub-band may be considered as a programmable number that allows a channelizer to be configured to route communications in sub-bands of various sizes in an efficient manner.

Individual switching stages may route data in various ways. A switching stage may include space switches, time switches, or a combination of space and time switches. Aspects of the present technology are not limited to any particular type of switch or design of a switching stage.

Figure 18:
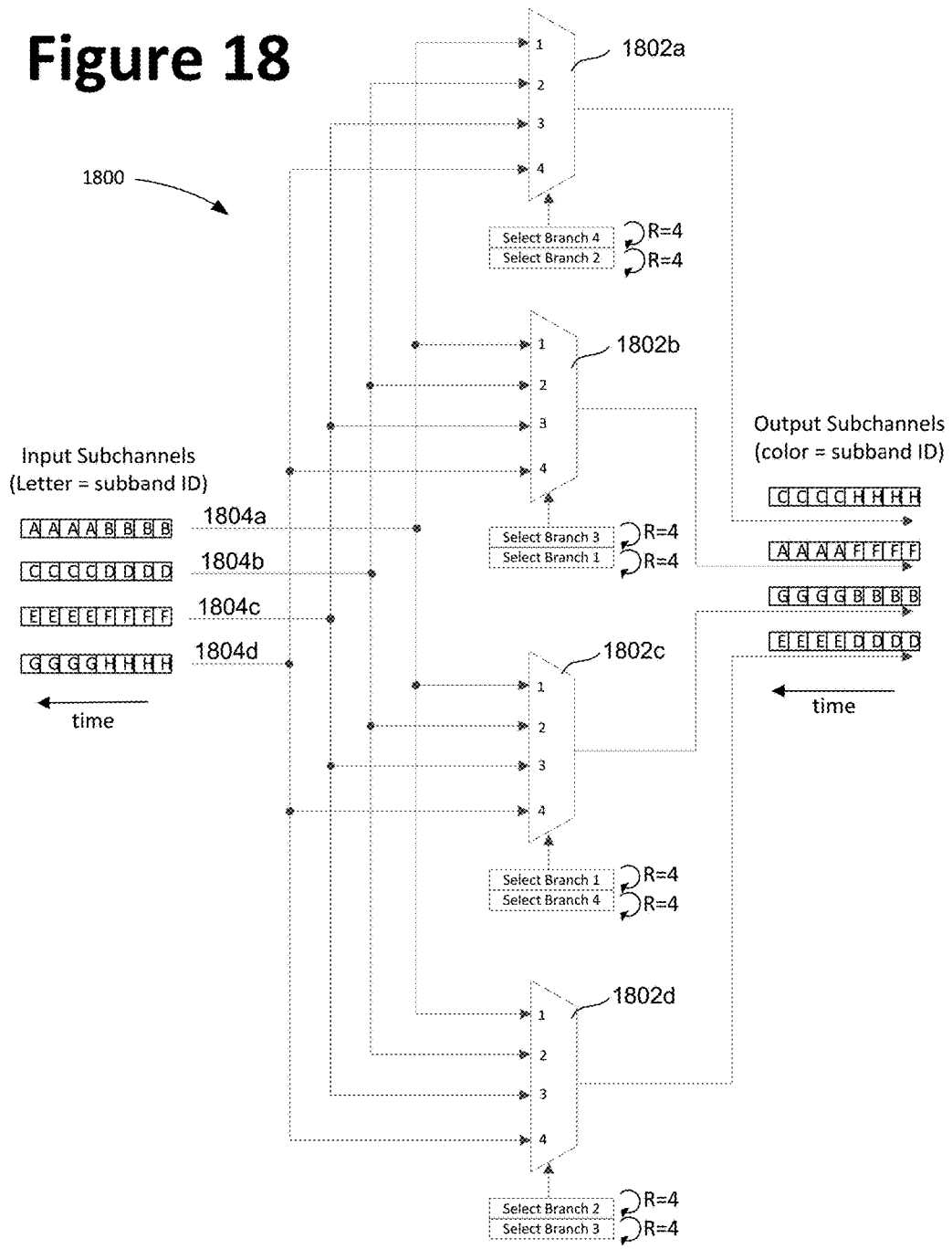
FIG. 18 shows an example of operation of multiplexers in a switching stage.

FIG. 18 illustrates an example of an implementation of a switching stage 1800 that has four inputs and four outputs and includes multiplexers 1802a to 1802d. Switching stage 1800 may be a switching stage of FIG. 17, or otherwise, embodied in a channelizer such as channelizer 442 as described above. Input subchannel samples of a frame are provided to the inputs with subchannel samples of a given sub-band having the same sub-band ID (letters A-H are used as sub-band IDs). Thus, four subchannel samples for sub-band A and four subchannel samples for sub-band B are provided to input 1804a, four subchannel samples for sub-band C and four subchannel samples for sub-band D are provided to input 1804b, four subchannel samples for sub-band E and four subchannel samples for sub-band F are provided to input 1804c, and four subchannel samples for sub-band G and four subchannel samples for sub-band H are provided to input 1804d.

Multiplexer 1802a is configured by a switching configuration to select branch 4 (input 4) for R clock cycles (R=4). Branch 4 of multiplexer 1802a connects to input 1804d so that multiplexer 1802a outputs four subchannel samples of sub-band H for four clock cycles. Multiplexer 1802a is configured by the switching configuration to select branch 2 (input 2) for a subsequent R cycles. Branch 2 of multiplexer 1802a connects to input 1804b so that multiplexer 1802a outputs four subchannel samples of sub-band C for four clock cycles.

Multiplexer 1802b is configured by the switching configuration to select branch 3 (input 3) for R clock cycles (R=4). Branch 3 of multiplexer 1802b connects to input 1804c so that multiplexer 1802b outputs four subchannel samples of sub-band F for four clock cycles. Multiplexer 1802b is configured by the switching configuration to select branch 1 (input 1) for a subsequent R cycles. Branch 1 of multiplexer 1802b connects to input 1804a so that multiplexer 1802b outputs four subchannel samples of sub-band A for four clock cycles.

Multiplexer 1802c is configured by the switching configuration to select branch 1 (input 1) for R clock cycles (R=4). Branch 1 of multiplexer 1802c connects to input 1804a so that multiplexer 1802a outputs four subchannel samples of sub-band B for four clock cycles. Multiplexer 1802c is configured by the switching configuration to select branch 4 (input 4) for a subsequent R cycles. Branch 4 of multiplexer 1802c connects to input 1804d so that multiplexer 1802c outputs four subchannel samples of sub-band G for four clock cycles.

Multiplexer 1802d is configured by a switching configuration to select branch 2 (input 2) for R clock cycles (R=4). Branch 2 of multiplexer 1802d connects to input 1804b so that multiplexer 1802d outputs four subchannel samples of sub-band D for four clock cycles. Multiplexer 1802d is configured by the switching configuration to select branch 3 (input 3) for a subsequent R cycles. Branch 3 of multiplexer 1802d connects to input 1804c so that multiplexer 1802d outputs four subchannel samples of sub-band E for four clock cycles.

While the example of FIG. 18 shows the example where R=4 (i.e. four subchannels per sub-band) it will be understood that any number of subchannels may be grouped in a similar manner and that the number of multiplexers, and number of inputs per multiplexer may be selected according to requirements and that four multiplexers with four inputs each is merely an example to illustrate operation of a switching stage.

An example of a configurable channelizer includes: N input ports and K output ports, each supporting M separately sampled subchannels; and one or more control circuits configured to store and apply a set of first routing tables to route subchannels in groups of R subchannels, each first routing table has M*K/R entries that link M*K/R groups of subchannels with the input groups, where R is an integer that is greater than or equal to 2.

The one or more control circuits may be configurable to route individual subchannels according to second routing tables, each second routing table including M*N entries that link the M subchannels of each of the N input ports with output ports. A group of subchannels may consist of R subchannels from an input port that are routed together according to the set of first routing tables, each of the N input ports providing one or more groups of R subchannels. A group of subchannels may consist of R subchannels received together that occupy sequential frequency ranges. The channelizer may include a plurality of switching blocks containing switching stages arranged in series, an individual switching stage configured to receive R subchannel samples from an input in series and to apply the same switching configuration for R clock cycles to route the R subchannel samples together. Each subchannel may be a 1 MHz subchannel, R is greater than or equal to 50, and a group of subchannels forms a sub-band of 50 MHz or more. The channelizer may be embodied in a communications satellite and an individual subchannel may carry data for an individual subscriber terminal that is in communication with the satellite. The communications satellite may use beam hopping and the set of first routing tables may include tables for a hopping period, the channelizer configured to store additional sets of routing tables for additional hopping periods.

An example of an apparatus includes: a plurality of input ports, an individual input port including M frequency demultiplexer circuits configured to generate M digitized subchannel streams; a plurality of output ports; and a plurality of switching blocks consisting of a plurality of switching stages disposed between the plurality of input ports and the plurality of output ports, each switching stage configured to apply a switching configuration per clock cycle to route sampled data from the plurality of input ports to the plurality of output ports, the switching configuration repeated for a number of clock cycles R.

The apparatus may include a first plurality of Radio Frequency (RF) antennas connected to the plurality of input ports and a second plurality of RF antennas connected to the plurality of output ports. The first plurality of RF antennas may be configured to receive RF communication and to provide the RF communication to the plurality of input ports and the plurality of switching stages may be configured to route the RF communication to selected RF antennas of the second plurality of RF antennas according to a beam hopping scheme. The plurality of switching stages are configured to route the RF communication to first selected RF antennas during a first epoch, to route the RF communication to second selected RF antennas during a second epoch, and route the RF communication to additional selected RF antennas during additional epochs of a hopping period of the beam hopping scheme. The apparatus may include a first routing table for the first epoch, and one or more control circuits may be configured to generate switching configurations for the plurality of switching stages for the first epoch from the first routing table. The apparatus may include additional routing tables for the second epoch and the additional epochs of the hopping period, and for epochs of additional hopping periods. The apparatus may include a first plurality of ferrite switches disposed between the first plurality of RF antennas and the plurality of input ports, a second plurality of ferrite switches disposed between the plurality of output ports and the second plurality of RF antennas, and a timing circuit that provides a synchronization signal to the plurality of switching stages, the first plurality of RF ferrite switches, and the second plurality of ferrite switches.

An example of a satellite communication system, includes: a gateway; a plurality of subscriber terminals; a satellite configured to communicate with the gateway and the plurality of subscriber terminals, the satellite comprising: a plurality of RF antennas configured for RF communication with the gateway and the plurality of subscriber terminals; an adaptive channelizer having a plurality of input ports connected to a first subset of the plurality of RF antennas, and a plurality of output ports connected to a second subset of the plurality of RF antennas, an individual input port configured to sample M subchannels, the adaptive channelizer configured to route R subchannels from the individual input port together to an output port, where R is a configurable integer that is greater than or equal to 1 and is less than or equal to M.

The number R may be a configurable number that is configurable to route sub-bands of different sizes. The adaptive channelizer may include a plurality of switching stages that individually apply switching configurations, a switching stage configured to apply a switching configuration R times in series. The number of input ports may be N, and the adaptive channelizer may be configured to route data according to a set of routing tables, each routing table containing a number of entries that is less than or equal to M*K. The satellite may be configured for communication with the plurality of subscriber terminals according to a beam hopping scheme and the one or more routing tables provide routing according to the beam hopping scheme.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A configurable channelizer comprising:
N input ports and K output ports, each supporting M separately sampled subchannels;
one or more control circuits configured to store and apply a set of first routing tables to route subchannels in groups of R subchannels, each first routing table has M*K/R entries that link M*K/R groups of subchannels with the input ports, where R is an integer that is greater than or equal to 2; and
a plurality of switching blocks, an individual switching block comprising a plurality of switching stages arranged in series, an individual switching stage configured to receive R subchannel samples from an input in series and to apply the same switching configuration for R clock cycles to route the R subchannel samples together.

2. The configurable channelizer of claim 1 wherein the one or more control circuits are configurable to route individual subchannels according to second routing tables, each second routing table including M*K entries that link the M subchannels of each of the K output ports with input ports.

3. The channelizer of claim 1, wherein a group of subchannels consists of R subchannels from an input port that are routed together according to the set of first routing tables, each of the N input ports providing one or more groups of R subchannels.

4. The channelizer of claim 3 wherein of a group of subchannels consists of R subchannels received together that occupy sequential frequency ranges.

5. The channelizer of claim 1 wherein R is greater than or equal to 50, and a group of subchannels forms a sub-band of 50 MHz or more.

6. The channelizer of claim 1, wherein the channelizer is embodied in a communications satellite and an individual subchannel carries data for an individual subscriber terminal that is in communication with the satellite.

7. The channelizer of claim 6, wherein the communications satellite uses beam hopping and the set of first routing tables includes tables for a hopping period, the channelizer configured to store additional sets of routing tables for additional hopping periods.

8. An apparatus comprising
a plurality of input ports, an individual input port including M sampling circuits configured to sample M subchannels;
a plurality of output ports; and
a plurality of switching blocks, an individual switching block consisting of a plurality of switching stages, arranged in series, disposed between the plurality of input ports and the plurality of output ports, each switching stage configured to apply a switching configuration per clock cycle to route sampled data received in series from the plurality of input ports to the plurality of output ports, the switching configuration repeated for a number of clock cycles R.

9. The apparatus of claim 8 further comprising a first plurality of Radio Frequency (RF) antennas connected to the plurality of input ports and a second plurality of RF antennas connected to the plurality of output ports.

10. The apparatus of claim 9 wherein the first plurality of RF antennas are configured to receive RF communication and to provide the RF communication to the plurality of input ports and the plurality of switching stages configured to route the RF communication to selected RF antennas of the second plurality of RF antennas according to a beam hopping scheme.

11. The apparatus of claim 10 wherein the plurality of switching stages are configured to route the RF communication to first selected RF antennas during a first epoch, to route the RF communication to second selected RF antennas during a second epoch, and route the RF communication to additional selected RF antennas during additional epochs of a hopping period of the beam hopping scheme.

12. The apparatus of claim 11 further comprising a first routing table for the first epoch, wherein one or more control circuits are configured to generate switching configurations for the plurality of switching stages for the first epoch from the first routing table.

13. The apparatus of claim 12 further comprising additional routing tables for the second epoch and the additional epochs of the hopping period, and for epochs of additional hopping periods.

14. The apparatus of claim 9 further comprising a first plurality of ferrite switches disposed between the first plurality of RF antennas and the plurality of input ports, a second plurality of ferrite switches disposed between the plurality of output ports and the second plurality of RF antennas, and a timing circuit that provides a synchronization signal to the plurality of switching stages, the first plurality of ferrite switches, and the second plurality of ferrite switches.

15. A satellite communication system, comprising:
a gateway;
a plurality of subscriber terminals;
a satellite configured to communicate with the gateway and the plurality of subscriber terminals, the satellite comprising:
a plurality of RF antennas configured for RF communication with the gateway and the plurality of subscriber terminals; and
an adaptive channelizer having a plurality of input ports connected to a first subset of the plurality of RF antennas, and a plurality of output ports connected to a second subset of the plurality of RF antennas, an individual input port configured to receive M subchannels, the adaptive channelizer configured to route R subchannels from the individual input port together to an output port, where R is a configurable integer that is greater than or equal to 1 and is less than or equal to M, the adaptive channelizer includes a plurality of switching blocks, an individual switching block comprising a plurality of switching stages arranged in series, an individual switching stage configured to receive R subchannel samples from an input in series and to apply the same switching configuration for R clock cycles to route the R subchannel samples together.

16. The satellite communications system of claim 15 wherein the number R is a configurable number that is configurable to route sub-bands of different sizes.

17. The satellite communications system of claim 15 wherein the number of input ports is N, and the adaptive channelizer is configured to route data according to a set of routing tables, each routing table containing a number of entries that is less than M*N.

18. The satellite communications system of claim 17 wherein the satellite is configured for communication with the plurality of subscriber terminals according to a beam hopping scheme and the one or more routing tables provide routing according to the beam hopping scheme.

* * * * *

UNITED STATES PATENT AND TRADEMARK OFFICE
CERTIFICATE OF CORRECTION

Page 1 of 1

PATENT NO. : 10,341,012 B2
APPLICATION NO. : 15/725194
DATED : July 2, 2019
INVENTOR(S) : Labreche et al.

It is certified that error appears in the above-identified patent and that said Letters Patent is hereby corrected as shown below:

On the Title Page

Item (73), Assignee: Delete "Space Systems/Loral, LLC, Palo Alto, CA (US)" and replace with
-- MacDonald, Dettwiler and Associates Corporation, Sainte-Anne-de-Bellevue, Quebec (CA) --

Signed and Sealed this
Twenty-first Day of July, 2020

Andrei Iancu
*Director of the United States Patent and Trademark Office*